(12) United States Patent
Hsieh

(10) Patent No.: US 11,460,449 B2
(45) Date of Patent: Oct. 4, 2022

(54) ESCAPE SYSTEM USED FOR CARS BEING SUNKEN INTO WATER AND ULTRASONIC COMPONENT

(71) Applicant: Jr-Hui Hsieh, Taoyuan (TW)

(72) Inventor: Jr-Hui Hsieh, Taoyuan (TW)

( * ) Notice: Subject to any disclaimer, the term of this patent is extended or adjusted under 35 U.S.C. 154(b) by 281 days.

(21) Appl. No.: 16/897,895

(22) Filed: Jun. 10, 2020

(65) Prior Publication Data

US 2021/0033569 A1 Feb. 4, 2021

(30) Foreign Application Priority Data

Aug. 1, 2019 (CN) .......................... 201910707375.4
May 28, 2020 (CN) .......................... 202010467142.4

(51) Int. Cl.

| | |
|---|---|
| *G01N 29/44* | (2006.01) |
| *G01N 29/024* | (2006.01) |
| *G01N 29/07* | (2006.01) |
| *H04W 4/02* | (2018.01) |

(Continued)

(52) U.S. Cl.
CPC ....... *G01N 29/4436* (2013.01); *B60R 22/322* (2013.01); *G01N 29/024* (2013.01); *G01N 29/07* (2013.01); *H04W 4/02* (2013.01); *H04W 4/48* (2018.02); *G01N 2291/011* (2013.01); *G01N 2291/045* (2013.01); *G01N 2291/048* (2013.01)

(58) Field of Classification Search
CPC .. G01N 29/07; G01N 29/024; G01N 29/4436; H04W 4/029; H04W 4/90; H04W 4/48; H04W 4/02; B60R 22/322; B60R 21/01; B60R 21/23; B60R 21/08; B60R 21/0136; G01F 23/2962

See application file for complete search history.

(56) References Cited

U.S. PATENT DOCUMENTS

| | | | | |
|---|---|---|---|---|
| 3,781,774 A | * | 12/1973 | Delignieres | ........... G01S 15/582 367/91 |
| 6,595,315 B1 | * | 7/2003 | Fujimoto | ................ G01S 15/96 367/111 |
| 10,150,439 B1 | * | 12/2018 | Hsieh | .................. B60R 21/0136 |

(Continued)

FOREIGN PATENT DOCUMENTS

| | | |
|---|---|---|
| TW | M416576 U | 11/2011 |
| TW | 201906755 A | 2/2019 |
| WO | 2019016583 A1 | 1/2019 |

OTHER PUBLICATIONS

1st office action for corresponding TW Application No. 109118847, dated May 6, 2021.

*Primary Examiner* — Helen C Kwok

(74) *Attorney, Agent, or Firm* — Demian K. Jackson; Jackson IPG PLLC

(57) ABSTRACT

An escape system used for a car being sunken into water and its ultrasonic component are illustrated. The ultrasonic component has a case and an ultrasonic module, and the escape system used for the car being sunken into water has the ultrasonic component and a mainboard. The present disclosure utilizes the property of the ultrasonic to recognize the type and thickness of obstacles which are accumulated in the ultrasonic component, and to determine whether a warning message for sweeping the obstacles should be sent, so as to maintain a sensitivity of the ultrasonic component and further to prevent the ultrasonic component from mistakenly judging that the car is sunken in water.

25 Claims, 21 Drawing Sheets

(51) Int. Cl.
*B60R 22/32* (2006.01)
*H04W 4/48* (2018.01)

(56) References Cited

U.S. PATENT DOCUMENTS

| | | | |
|---|---|---|---|
| 10,255,782 B1* | 4/2019 | Ghannam | G08B 21/20 |
| 10,352,086 B2 | 6/2019 | Hsieh | |
| 10,414,235 B1* | 9/2019 | Yassan | G01S 7/539 |
| 10,488,246 B1* | 11/2019 | Hsieh | G01F 23/2962 |
| 10,564,027 B1* | 2/2020 | Hsieh | G08B 21/08 |
| 2015/0066339 A1* | 3/2015 | Hoare | G01F 23/2962 |
| | | | 701/116 |
| 2016/0311406 A1* | 10/2016 | Deeks | B60F 3/0053 |
| 2018/0215381 A1* | 8/2018 | Owen | B60W 40/06 |
| 2019/0392697 A1* | 12/2019 | Perez Barrera | B60W 50/14 |
| 2020/0256112 A1* | 8/2020 | Williams | E05F 15/71 |
| 2021/0033568 A1* | 2/2021 | Hsieh | G01N 29/07 |

* cited by examiner

ESCAPE SYSTEM USED FOR CARS BEING SUNKEN INTO WATER AND ULTRASONIC COMPONENT

TECHNICAL FIELD

The present disclosure relates to an escape system used for a car being sunken into water and an ultrasonic component of the escape system, both of which utilize the property of the ultrasonic to transmit a car sunken signal and an obstacle signal, to recognize the type and thickness of obstacles which are accumulated in the ultrasonic component, and to determine whether a warning message for sweeping the obstacles should be sent, so as to maintain a sensitivity of the ultrasonic component and further to prevent the ultrasonic component from mistakenly judging that the car is sunken into water. The escape system used for the car being sunken into water and its ultrasonic component of the present disclosure are helpful to quickly receive and send out the information which the car is sunken in water, so as to grasp the rescue opportunity.

RELATED ART

In the government promotion information, people are often educated that when their cars fall into water accidentally, the cars may be sunken easily due to the weight of the engines at the car heads. When this thing happens, people in the car should keep calm, unlock the safety belt firstly and open a car window as soon as possible, so that they can climb out of the car from the car window before the car has been sunken in water. However, if the car has already been sunken in water, the car doors will not be opened easily due to the water pressure difference between the inner part and the outer part of the car, and the automatic car windows will not be activated as water has entered into the car. At this moment, the car will be sunken completely in about 90 seconds, and the trapped persons should find a sharp object in the car in time to strike the front or back windshield to grasp a chance of survival. On the contrary, if not being able to take the chance of escape in 90 seconds, the trapped persons will have a very little chance of survival.

TW Patent TW M416576 provides a conventional escape system used for a car being sunken into water includes a car body, an inflating device, a water gauge and a control unit. The car body is provided with sides, and the inflating device is mounted on one side of the car body and includes a pressurized gas cylinder, an inflating ball and an inflating ball control module. The pressurized gas cylinder is mounted inside the car body, the inflating ball is mounted outside the car body, and the inflating ball control module is connected to the pressurized gas cylinder and the inflating ball. The inflating ball control module includes a hoop, a pressurized gas cylinder switch and a driver unit. The water gauge is mounted outside the car body, and the control unit is electrically connected to the water gauge and the inflating ball control module. Accordingly, when the water gauge has detected that the water level is too high, the inflating device can be activated to inflate the inflating ball quickly, thereby preventing the car body from being sunken in water, which in turn can save the life of the driver. Furthermore, a warning lamp is mounted on a top of the headlight to flash for rescue. However, when the car falls into water, the water gauge and the inflating ball will move upward due to the buoyancy effect of water, and an activating time of the inflating ball is affected by a spring tension, which acts as a resistant force. Therefore, a signal transmission time of a sensor is delayed, which in turn postpones timing of inflating the inflating ball. Eventually, the timing for rescuing the trapped person is missed.

Further, the water gauge of the escape system used for the car being sunken into water comprises a case, an inflation barrel, a rod, a spring and the sensor. The case has a bottom part and a water inlet, and the obstacle, such as snow, sand, dust and other object unavoidably enters water gauge via the After the snow is frozen, the spring may be stuck, and the water gauge becomes invalid. Similarly, the sands, dusts and other objects may be accumulated for a period, and the spring is stuck to make the water gauge invalid. Further, when the obstacle, such as the snow, sand, dust and other object, enters the water gauge, the water gauge has no warning mechanism to identify the types of the obstacles. Thus, it causes the user of the car not to know that the watergauge is invalid, and the user mistakenly believes the water gauge works well. It is a very bad thing that life and safety of the user depend on the invalid water gauge.

Other related patent documents are U.S. Pat. Nos. 10,352,086, 10,150,439 and 10,564,027.

SUMMARY OF THE PRESENT DISCLOSURE

A main objective of the present disclosure is to provide an escape system used for a car being sunken into water and an ultrasonic component of the escape system, which can transmit a car sunken signal or an obstacle signal, and identify the type of the obstacle to prevent the ultrasonic component from mistakenly judging that the car is sunken. Thus, the escape system and its ultrasonic component are helpful to quickly and correctly send out the information which the car is sunken, so as to grasp the rescue opportunity.

According to one objective of the present disclosure, the present disclosure provides an ultrasonic component comprising: a case, having a reception space therein, at least one side of the case has at least one penetration hole; and an ultrasonic module, disposed in the reception space, the ultrasonic module comprises an ultrasonic signal transmitting unit, at least one top receiving unit electrically connected to the ultrasonic signal transmitting unit, a calculation unit electrically connected to the top receiving unit and a signal transmitting unit electrically connected to the calculation unit; both of the ultrasonic signal transmitting unit and the top receiving unit are disposed at one side of the reception space, and the ultrasonic signal transmitting unit and the top receiving unit are disposed on a top part of the reception space; wherein the ultrasonic signal transmitting unit projects an ultrasonic wave; the ultrasonic signal transmitting unit is disposed at a projection point, the ultrasonic signal transmitting unit projects the ultrasonic wave to a bottom wall surface of the case with a projection angle, wherein the projection angle is a complementary angle of an angle formed between a propagating direction of the ultrasonic wave and a gravity line of the projection point, and the projection angle is less than 90 degrees and larger than 0 degree; wherein the ultrasonic wave firstly collides with a reflection point of the bottom wall surface, and then is reflected to generate a primary reflection wave; the primary reflection wave propagates toward a top wall surface of the case, and then firstly collides with a scheduled reception point of the top wall surface; a primary path is formed from a path from the projection point to the reflection point and a path from the reflection point to the scheduled reception point; the top receiving unit is not disposed in the primary path.

According to one objective of the present disclosure, the present disclosure provides an ultrasonic component comprising: a case, having a reception space therein, at least one side of the case has at least one penetration hole; and an ultrasonic module, disposed in the reception space, the ultrasonic module comprises an ultrasonic signal transmitting unit, at least one top receiving unit electrically connected to the ultrasonic signal transmitting unit, a calculation unit electrically connected to the top receiving unit and a signal transmitting unit electrically connected to the calculation unit; both of the ultrasonic signal transmitting unit and the top receiving unit are disposed at one side of the reception space, and the ultrasonic signal transmitting unit and the top receiving unit are disposed on a top part of the reception space; wherein the ultrasonic signal transmitting unit projects an ultrasonic wave; the ultrasonic signal transmitting unit is disposed at a projection point, the ultrasonic signal transmitting unit projects the ultrasonic wave to a bottom wall surface of the case with a projection angle, wherein the projection angle is a complementary angle of an angle formed between a propagating direction of the ultrasonic wave and a gravity line of the projection point, and the projection angle is less than 90 degrees and larger than 0 degree; wherein the ultrasonic wave firstly collides with a reflection point of the bottom wall surface, and then is reflected to generate a primary reflection wave; the primary reflection wave propagates toward a top wall surface of the case, and then firstly collides with a scheduled reception point of the top wall surface; a primary path is formed from a path from the projection point to the reflection point and a path from the reflection point to the scheduled reception point; the top receiving unit is disposed in the primary path, the ultrasonic signal transmitting unit projects the ultrasonic wave by projecting an ultrasonic pulse wave with a pulse repetition period, and the pulse repetition period is transmitted to the top receiving unit; when the top receiving unit does not receive a reflection wave in two adjacent pulse repetition periods, the top receiving unit generates an interrupt signal to the calculation unit, wherein the reflection wave is generated after the ultrasonic wave collides with at least one obstacle on a bottom part of the reception space; the calculation unit converts the interrupt signal into a car sunken signal or an obstacle signal, and transmits the car sunken signal or the obstacle signal to the signal transmitting unit.

According to one objective of the present disclosure, the present disclosure provides an escape system used for a car being sunken into water, installed in the car, and the escape system at least comprises: the at least one of the above ultrasonic components; and a mainboard, electrically connected to the ultrasonic component; after the mainboard receives the car sunken signal transmitted by the signal transmitting unit, a motor electrically connected to the mainboard is controlled to open at least one car window, and an electromagnetic switch electrically connected to the mainboard is controlled to release at least one safety belt.

According to the escape system, the escape system further comprises an uninterrupted power system which makes required power of the escape system uninterrupted.

According to the escape system, the escape system is further linked to an application (APP) installed in a device of the car or a mobile communication device of the user of the car, and after the escape system receives the car sunken signal, an automatic location function of the application is activated.

BRIEF DESCRIPTIONS OF DRAWINGS

DETAILS OF EXEMPLARY EMBODIMENT

For the examiners to understand the technical features, the content, and the advantages of the present invention, as well as the benefits that the present invention can achieve, the present invention is hereinafter described in details with the accompanying drawings and the expression in the form of an embodiment. The drawings used in the description are only for illustration and as assistance to the specification, which may not be necessarily true in scale and precise configuration after the implementation of the present invention. Therefore, one should not interpret according to the scale and configuration in the accompanying drawings to limit the claims of the present invention on practical implementation.

Figure 1A:
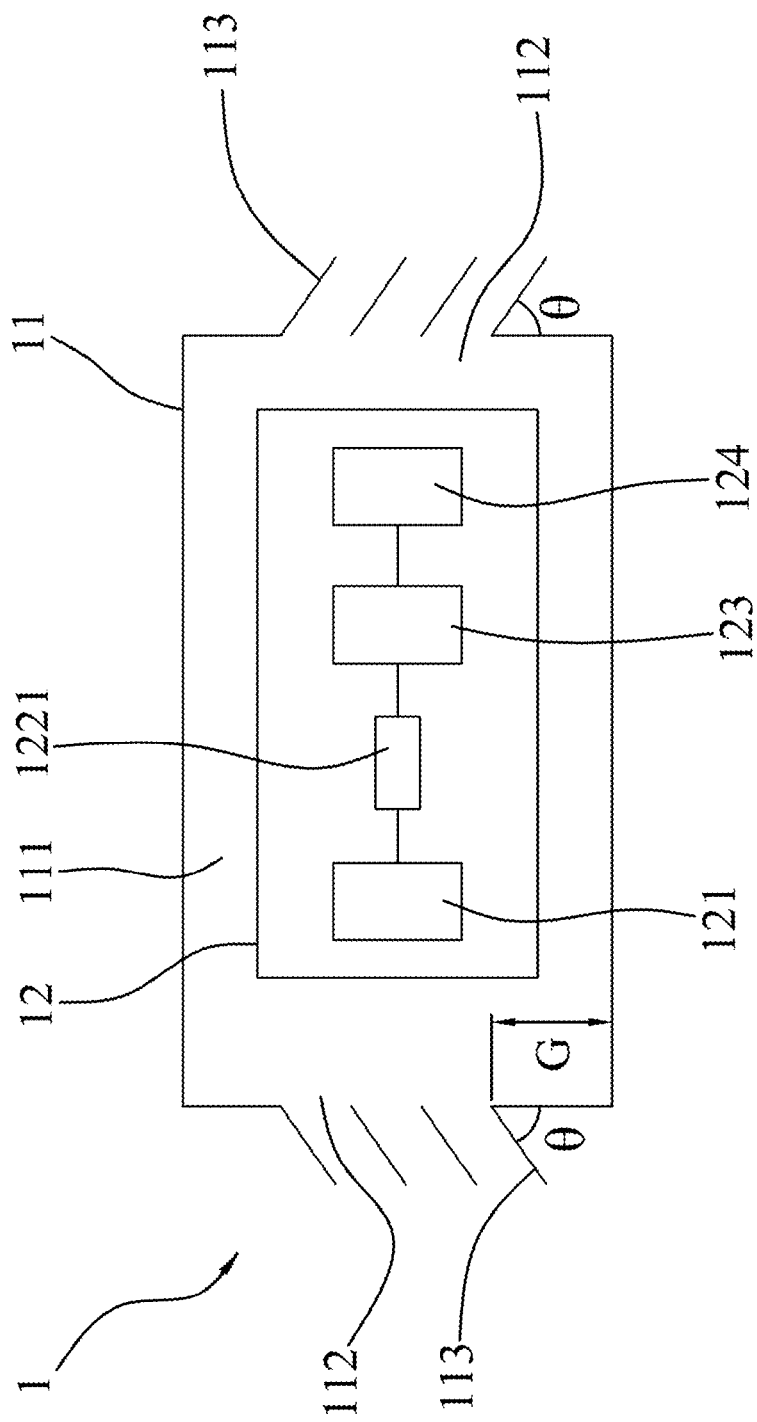
FIG. 1A is a first block diagram showing a configuration of an ultrasonic component in an embodiment of the present disclosure.
Figure 1B:
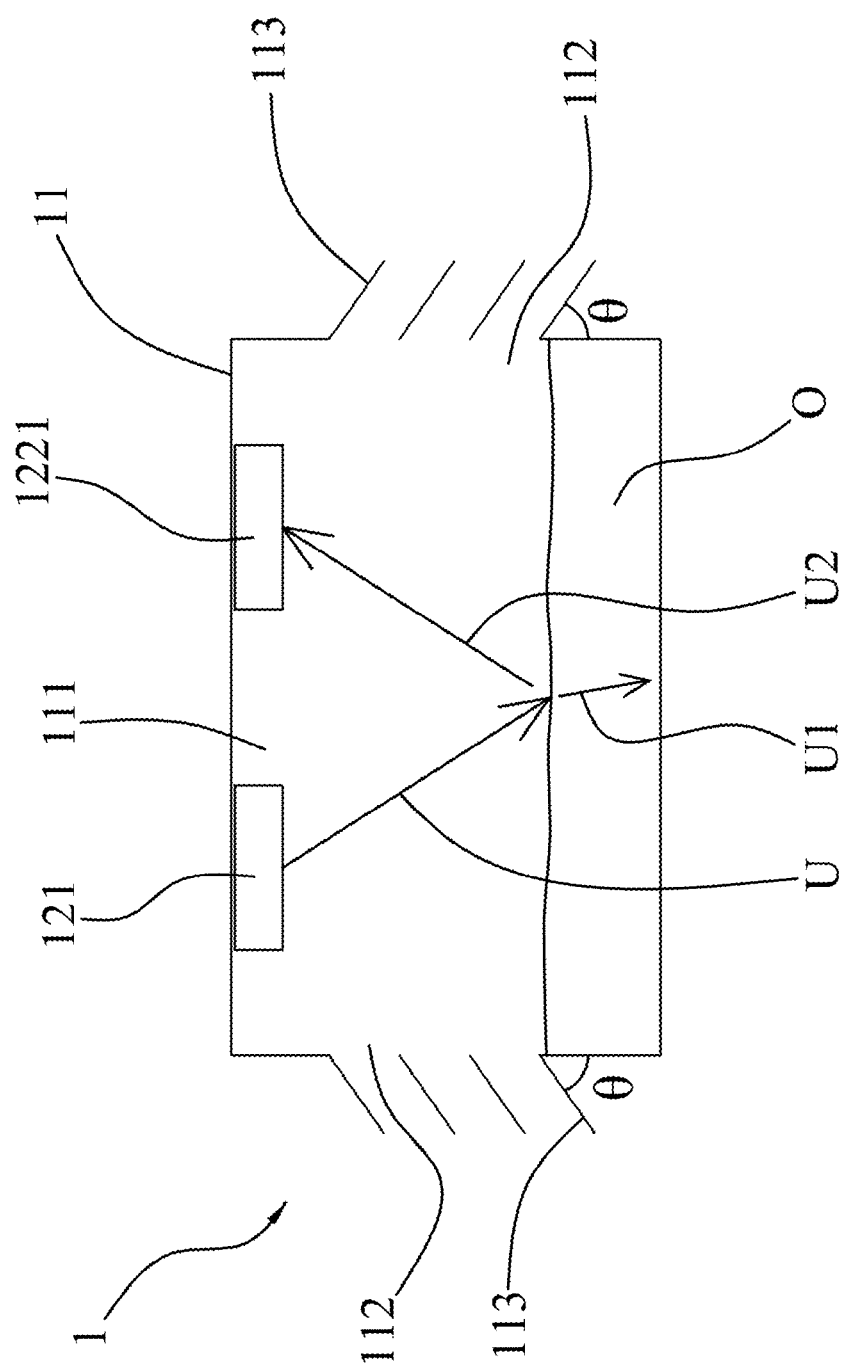
FIG. 1B is a schematic diagram showing an operation of the ultrasonic component in an embodiment of the present disclosure when the at least one obstacle exists.
Figure 1C:
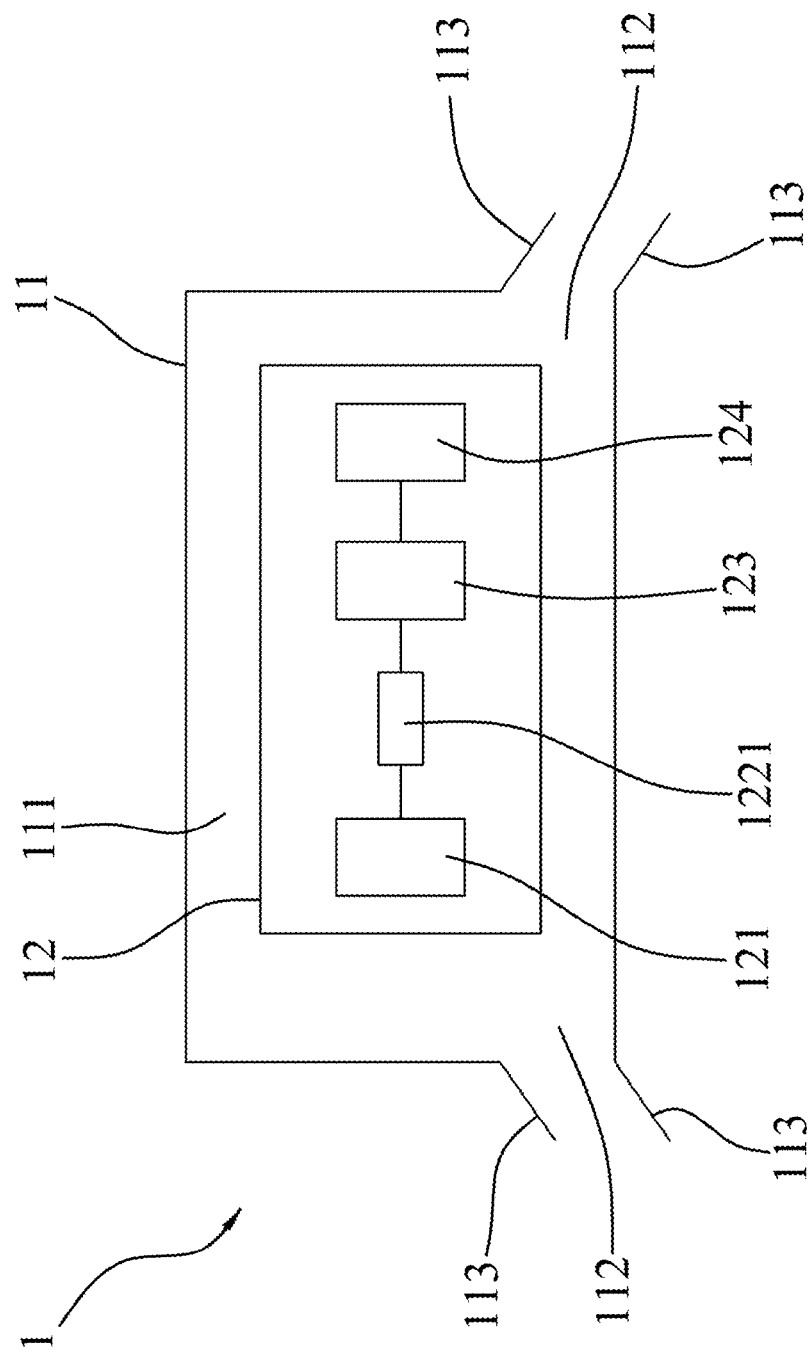
FIG. 1C is a second block diagram showing a configuration of an ultrasonic component in an embodiment of the present disclosure.

Firstly, referring to FIG. 1A, FIG. 1B and FIG. 1C, the ultrasonic component (1) of the present disclosure at least comprises a case (11) and an ultrasonic module (12).

The case (11) has a reception space (111) therein, each of two opposite sides of the case (11) has at least one penetration hole (112), and the case (11) further has at least two shielding plates (113) on the two sides of the penetration hole (112), wherein the shielding plate (113) and the side of the case (11) have a shielding plate angle (θ) therebetween. Further, the shielding plate angle (θ) is 5 degrees through 65 degrees. In a preferred embodiment of the present disclosure, the case (11) is a rectangle case with the reception space (111) formed therein, the reception space (111) is filled with air, each of the left and tight sides of the case (11) has at least the penetration hole (112), each of the top and bottom sides of the penetration hole (112) has the shielding plate (113), and the penetration hole (112) and the bottom part of the case (11) form a shielding plate height deviation (G), as shown in FIG. 1A. When the a shielding plate height deviation (G) is 0, the penetration hole (112) is disposed on the interconnection of the bottom part of the case (11) and the right or left sides of the case (11), as shown in FIG. 1C. Preferably, the shielding plates (113) on the top and bottom sides of the penetration hole (112) are arranged in parallel, one of the shielding plates (113) of the penetration hole (112) and the side of the case (11) has the shielding plate angle (θ) being 5 degrees through 65 degrees, and the other one of the shielding plates (113) of the penetration hole (112) and the side of the case (11) form a compliant angle of the shielding plate angle (θ). The shielding plate angle (θ) formed by the shielding plate (113) and the case (11) is used to prevent the mistaken judge condition when the car is not sunken but the water enters the case (11), such as, the user washes the car or it rains. Further, the shielding plate angle (θ) formed by the shielding plate (113) and the case (11) can be used to prevent the obstacle, such as fog, snow, sand, dust or other object enters the case (11). The fog is usually generated at the night without clouds in the winter, and when the wind is weak, and the ground air is relatively stable with sufficient moisture, the moisture of the low altitude which is floated near the ground is cooled and condensed to small droplets due to the quick heat dissipation effect on the ground, and thus the fog can enter the case (11) via the penetration hole (112) to form the obstacle in the case (11). Water vapor in the air can be directly condensed to generate the snow, the water vapor may form the ice crystals due to the low temperature, and when the temperature is sufficiently low, the ice crystals form the snow, and thus the water vapor enters the case (11) via the penetration hole (112) and forms the snow to form the obstacle in the case (11). The small sand and dust are unavoidably brought into the case (11) by the flowing air, especially, when the car moves with the high speed, the dust on the road is brought into the case (11) via the penetration hole (112) to form the obstacle in the case (11).

Referring to FIG. 1A, the ultras module (12) is disposed in the reception space (111). The ultrasonic module (12) comprises an ultrasonic signal transmitting unit (121), a top receiving unit (1221) electrically connected to the ultrasonic signal transmitting unit (121), a calculation unit (123) electrically connected to the top receiving unit (1221) and a signal transmitting unit (124) electrically connected to the calculation unit (123). Referring to FIG. 1B, the ultrasonic signal transmitting unit (121) and the top receiving unit (1221) are disposed at the same side of the reception space (111), and the ultrasonic signal transmitting unit (121) and the top receiving unit (1221) are disposed on a top part of the reception space (111). As shown in FIG. 1B, the ultrasonic signal transmitting unit (121) projects an ultrasonic wave (U), and after the ultrasonic wave (U) collides with an obstacle (O) in the case (11), the ultrasonic wave (U) is divided into a penetration wave (U1) and a reflection wave (U2), the penetration wave (U1) is generated after the ultrasonic wave (U) firstly penetrates the obstacle (O), and the reflection wave (U2) is generated after the ultrasonic wave (U) firstly collides with the obstacle (O). In other words, the ultrasonic wave (U) forms the penetration wave (U1) and the reflection wave (U2) after colliding with the obstacle (O). It is noted that, the obstacle (O) can be water (liquid water), snow (solid water (solid water), fog (gas water), water (liquid water) melted from the snow or condensed from the fog, sand, dust or other object. The obstacle (O) usually covers the bottom part of the case (11) in the reception space (111). The top receiving unit (1221) receives the reflection wave (U2) and measures the speed of the reflection wave (U2). The speed of the reflection wave (U2) is the speed of the ultrasonic wave (U). When the ultrasonic signal transmitting unit (121) projects the ultrasonic wave (U), an initial time which the ultrasonic wave (U) is projected is synchronously transmitted to the top receiving unit (1221).

Figure 1D:
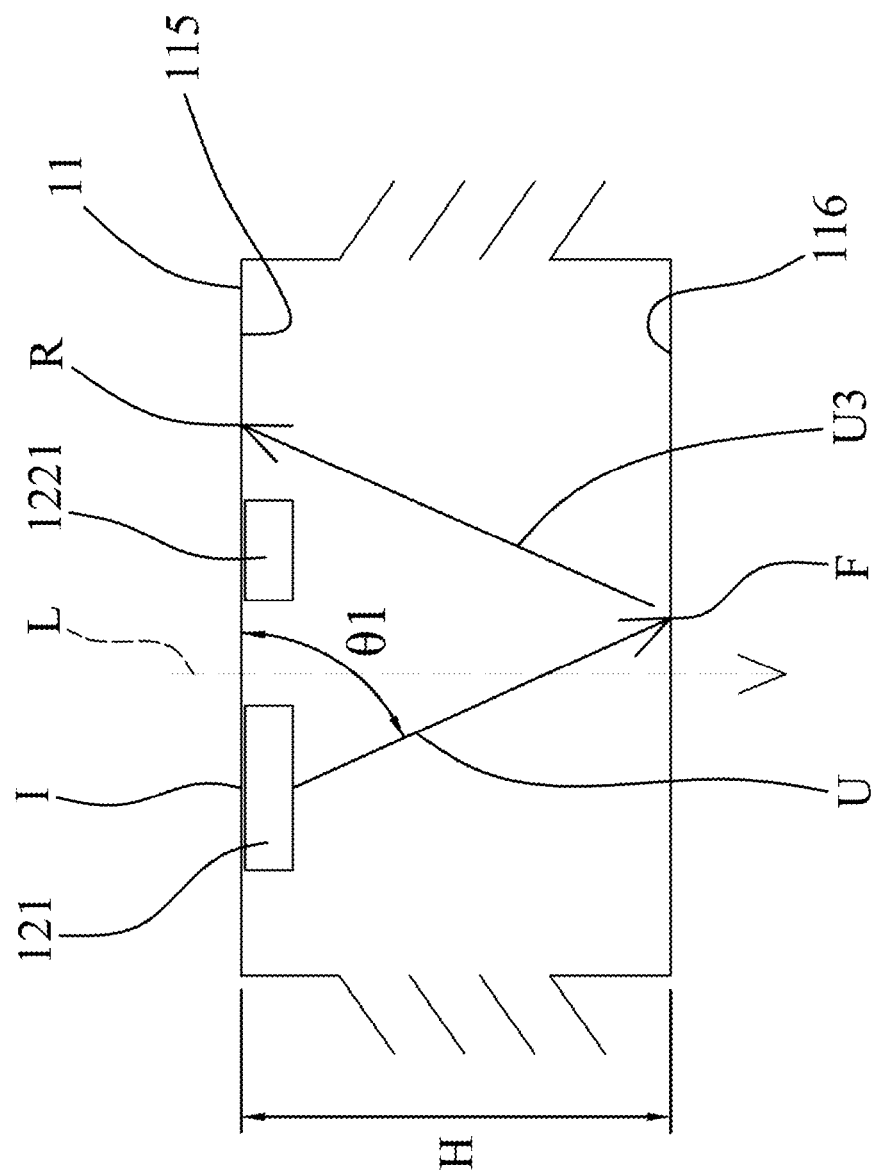
FIG. 1D is a schematic diagram showing an operation of the ultrasonic component in an embodiment of the present disclosure when the no obstacles exist.
Figure 1E:
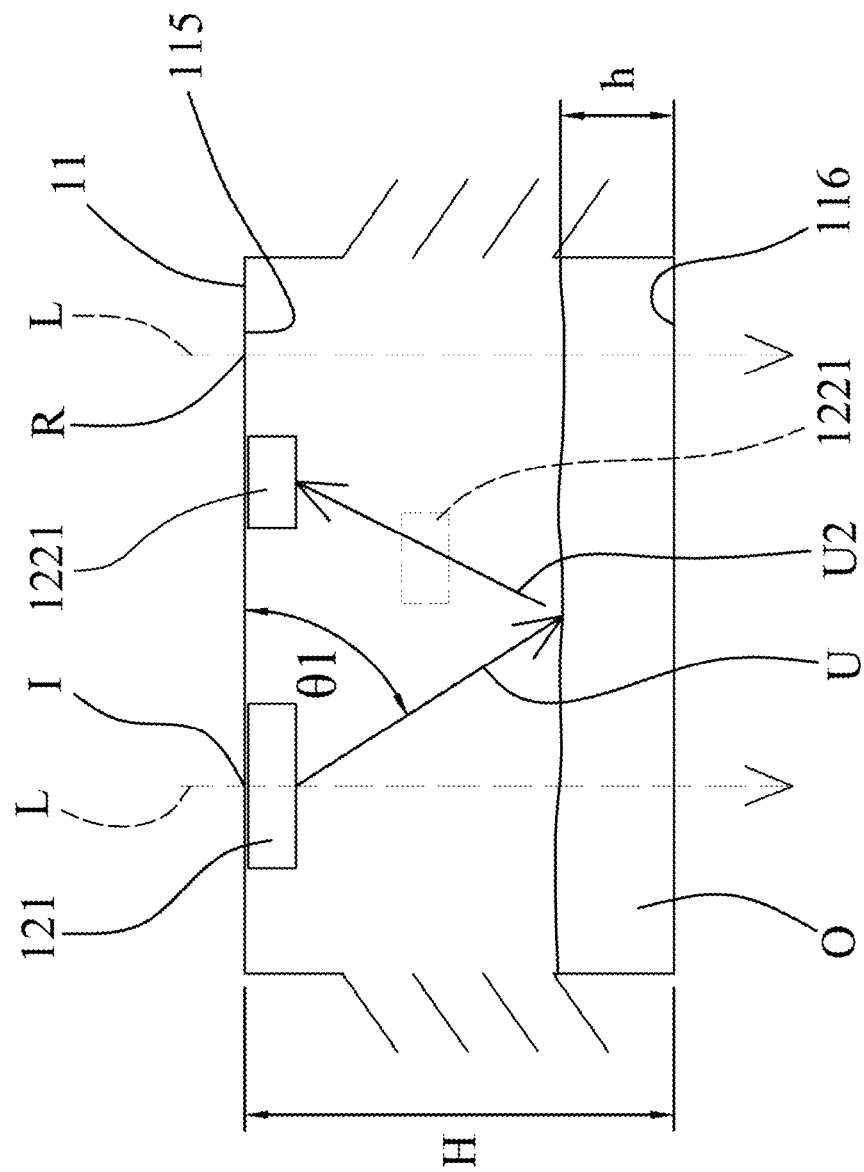
FIG. 1E is a schematic diagram showing an operation of the ultrasonic component in an embodiment of the present disclosure when an ultrasonic signal transmitting unit and a bottom wall surface have a first height deviation therebetween.

Please refer to FIG. 1D and FIG. 1E. As shown in FIG. 1D, the ultrasonic signal transmitting unit (121) is disposed at a projection point (I) of a top wall surface (115) of the case (11). The ultrasonic signal transmitting unit (121) projects the ultrasonic wave (U) to a bottom wall surface (116) of the case (11) with a projection angle (θ1). The projection angle (θ1) formed by the ultrasonic wave (U) and the top wall surface (115), and specifically, the projection angle (θ1) is a complementary angle of an angle formed between a propagating direction of the ultrasonic wave (U) and a gravity line (L) of any point on the propagating direction of the ultrasonic wave (U), and the projection angle (θ1) is less than 90 degrees and larger than 0 degree. The gravity line (L) is a virtual line pointing to an earth center, for example, the above gravity line (L) is usually vertical to horizon, and thus the gravity line (L) is the gravity direction. When no obstacles exist in the case (11), and that is, the reception space (111) is filled with air. The ultrasonic wave (U) firstly collides with a reflection point (F) of the bottom wall surface (116), and then a primary reflection wave (U3) is generated. The primary reflection wave (U3) propagates toward the top wall surface (115), and firstly collides with a scheduled reception point (R) of the top all surface (115). The primary path is formed from a path from the projection point (I) to the reflection point (F) and a path from the reflection point (F) to the scheduled reception point (R). The top receiving unit (1221) is not disposed in the primary path. Preferably, the top receiving unit (1221) is disposed on the top wall surface (115), and the top receiving unit (1221) is disposed between the projection point (I) and the scheduled reception point (R), but not on the scheduled reception point (R). Preferably, the top receiving unit (1221) is disposed between the gravity line (L) of the projection point (I) and the gravity line (L) of the scheduled reception point (R), but not on the scheduled reception point (R). For example, in FIG. 1E, a location of a dotted line for representing the top receiving unit (1221) is disposed between the gravity line (L) of the projection point (I) and the gravity line (L) of the scheduled reception point (R), but the top receiving unit (1221) is not disposed on the top wall surface (115). For example, when installing the ultrasonic signal transmitting unit (121), a first height deviation (H) between the ultrasonic signal transmitting unit (121) and the bottom wall surface is known, the distance between the projection point (I) and the scheduled reception point (R) is a value which a twice of the first height deviation (H) is divided by a tangent value of the projection angle (θ1), and the related equation is expressed as follows:

$$A = \frac{H}{\tan(\theta 1)} \times 2;$$

wherein A is the distance between projection point (I) and the scheduled reception point (R), H is the first height deviation, and the tan(θ1) is the tangent value of the projection angle (θ1). The distance between the top receiving unit (1221) and the projection point (I) is less than the distance between the projection point (I) and the scheduled reception point (R). Referring to FIG. 1E, when at least one obstacle (O) exists in the case (11), as mentioned above, the ultrasonic wave (U) projected by ultrasonic signal transmitting unit (121) firstly collides with the obstacle (O), and then is reflected to generate a reflection wave (U2) being received by the top receiving unit (1221). After the top receiving unit (1221) receives the reflection wave (U2), the top receiving unit (1221) generates a reception signal to the calculation unit (123). The calculation unit (123) converts the reception signal into a car sunken signal or an obstacle signal, and transmits the car sunken signal or the obstacle signal to the signal transmitting unit (124). The signal transmitting unit (124) transmits the car sunken signal or the obstacle signal via a wired or wireless manner to a mainboard of the car.

It is noted that, when the ultrasonic signal transmitting unit (121) projects the ultrasonic wave (U), the initial time is synchronously transmitted to the top receiving unit (121). The top receiving unit (1221) receives the reflection wave (U2) and records a reception time of the reflection wave (U2). The top receiving unit (1221) obtains a reflection time difference by subtracting the initial time from the reception time, and the top receiving unit (1221) analyzes a reflection distance according to the reflection time difference. The reflection distance is obtained by multiplying a speed of the reflection wave (U2) with the reflection time difference. The top receiving unit (121) transmits the reflection distance to the calculation unit (123), and the calculation unit (123) calculates an obstacle thickness (h) of the at least one obstacle (O) stacked on a bottom part of the reception space (111). The obstacle thickness (h) is obtained by subtracting a product of the half reflection distance and the sine value of the projection angle (θ1) from the first height deviation (H), and can be expressed by a related equation as follows:

$$h = H - \frac{B}{2} \times \sin(\theta 1);$$

wherein h is the obstacle thickness, H is the first height deviation, B is the reflection distance, and sin(θ1) is the sine value of the of the projection angle. The calculation unit (123) transmits the obstacle thickness (h) to the signal transmitting unit (124), the signal transmitting unit (124) transmits the obstacle thickness (h) to the mainboard of the car via the wired or wireless manner. Thus, the ultrasonic module (12) is capable of recognize the obstacle thickness (h) of the obstacle (O) stacked in the case (11), and the driver or the maintenance staff can use the obstacle thickness (h) as a basis for the following decision.

Figure 1F:
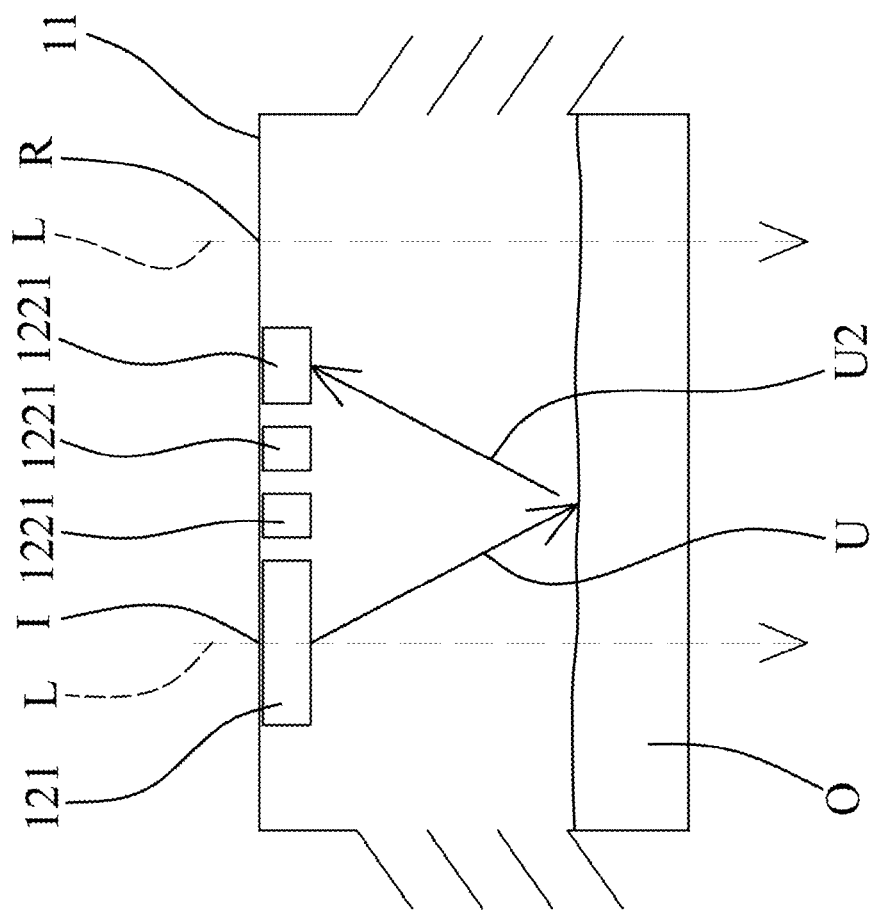
FIG. 1F is a schematic diagram showing an operation of the ultrasonic component in an embodiment of the present disclosure when the ultrasonic component has multiple top receiving units.

Referring to FIG. 1F, multiple top receiving units (1221) are disposed between the gravity line (L) of the projection point (I) and the gravity line (L) of the scheduled reception point (R) in a line fashion, and each of the top receiving units (1221) is electrically connected to the calculation unit (123) and the ultrasonic signal transmitting unit (121). The line fashion can be a straight or a curved line fashion. Preferably, the top receiving units (1221) are disposed on the top wall surface (115), and the top receiving units (1221) are disposed between the projection point (I) and the scheduled reception point (R), and arranged in a column or row. When the obstacle thickness (h) continuously increase, the reflection wave (U2) generated after the ultrasonic wave (U) projected by the ultrasonic signal transmitting unit (121) collides with the obstacle (O) is sequentially received by the top receiving unit (1221). After the top receiving units (1221) sequentially receive the reflection wave (U2), reception signals are sequentially generated to the calculation unit (123). The calculation unit (123) sequentially converts the reception signals into the car sunken signal or obstacle signal to the signal transmitting unit (124). The signal transmitting unit (124) sequentially transmits the car sunken signal or the obstacle signal to the mainboard of the car via the wired or wireless manner. Similarly, the calculation unit (123) sequentially calculates the obstacle thickness (h) of the obstacle (O), and sequentially transmits the obstacle thickness (h) to the signal transmitting unit (124). The signal transmitting unit (124) sequentially transmits obstacle thickness (h) to the mainboard of the car via the wired or wireless manner. Preferably, the ultrasonic signal transmitting unit (121) projects the ultrasonic wave (U) by projecting an ultrasonic pulse wave with a pulse repetition period. The pulse repetition period is transmitted to the top receiving unit (1221). It is noted that, the top receiving unit (1221) discards and does not calculate an ultrasonic pulse wave not corresponding to the pulse repetition period. In other words, the top receiving unit (1221) ignores the ultrasonic pulse wave not corresponding to the pulse repetition period, and considers it as noise. Preferably, the pulse repetition period is larger than the reflection time difference, so as to prevent the ultrasonic pulse wave from interfering the next ultrasonic pulse wave. The pulse repetition period can be determined as follows:

$$P > \frac{2H}{U \times \sin(\theta 1)}$$

wherein P is the pulse repetition period, H is the first height deviation, U is the speed of the ultrasonic wave, and $\sin(\theta 1)$ is the sine value of the projection angle.

Figure 1G:
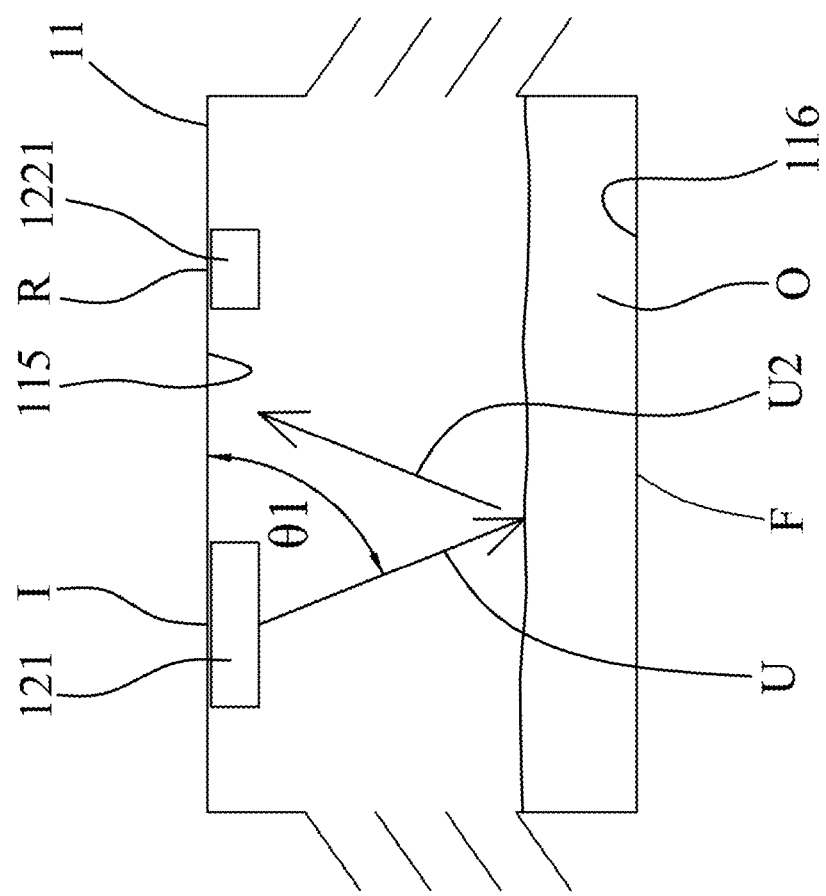
FIG. 1G is a schematic diagram showing an operation of the ultrasonic component in an embodiment of the present disclosure when a top receiving unit is disposed on a scheduled reception point.

Referring to FIG. 1G, another manner for generating the car sunken signal or the obstacle signal is illustrated. The top receiving unit (1221) is disposed in the primary path, and preferably, the top receiving unit (1221) is disposed on the scheduled reception point (R). When the top receiving unit (1221) does not receive the reflection wave (U2) in two adjacent pulse repetition periods, the top receiving unit (1221) generates an interrupt signal to the calculation unit (123). The calculation unit (123) converts the interrupt signal to the car sunken signal or the obstacle signal to the signal transmitting unit (124). The signal transmitting unit (124) transmits the car sunken signal or the obstacle signal to the mainboard of the car via the wired or wireless manner.

Figure 2A:
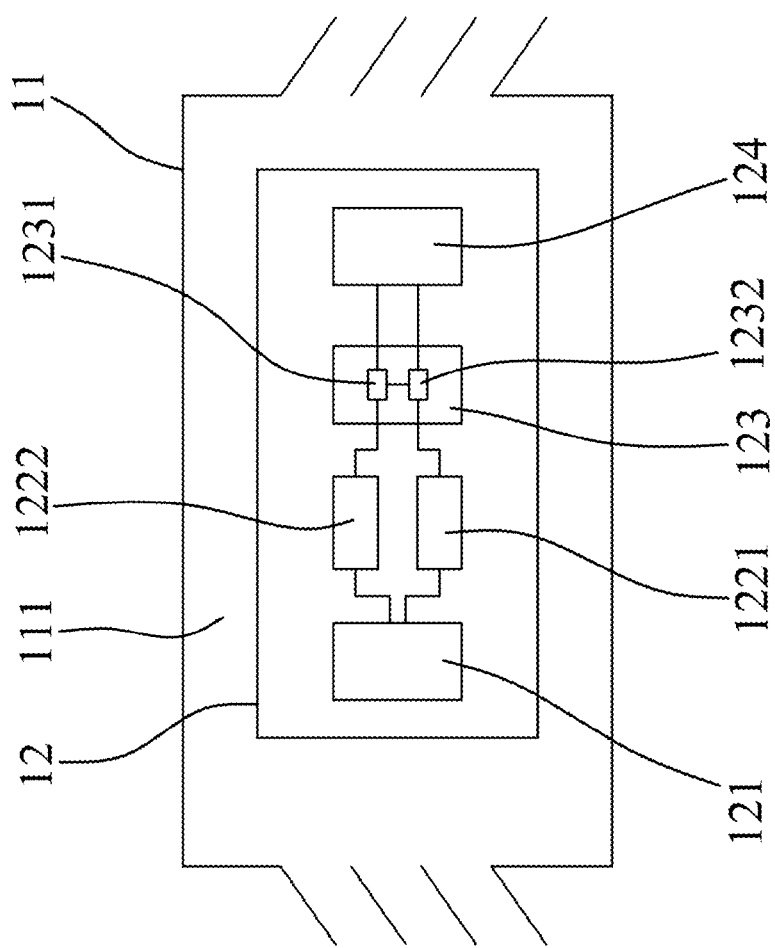
FIG. 2A is a block diagram showing a configuration of an ultrasonic component having a bottom receiving unit in an embodiment of the present disclosure.
Figure 2B:
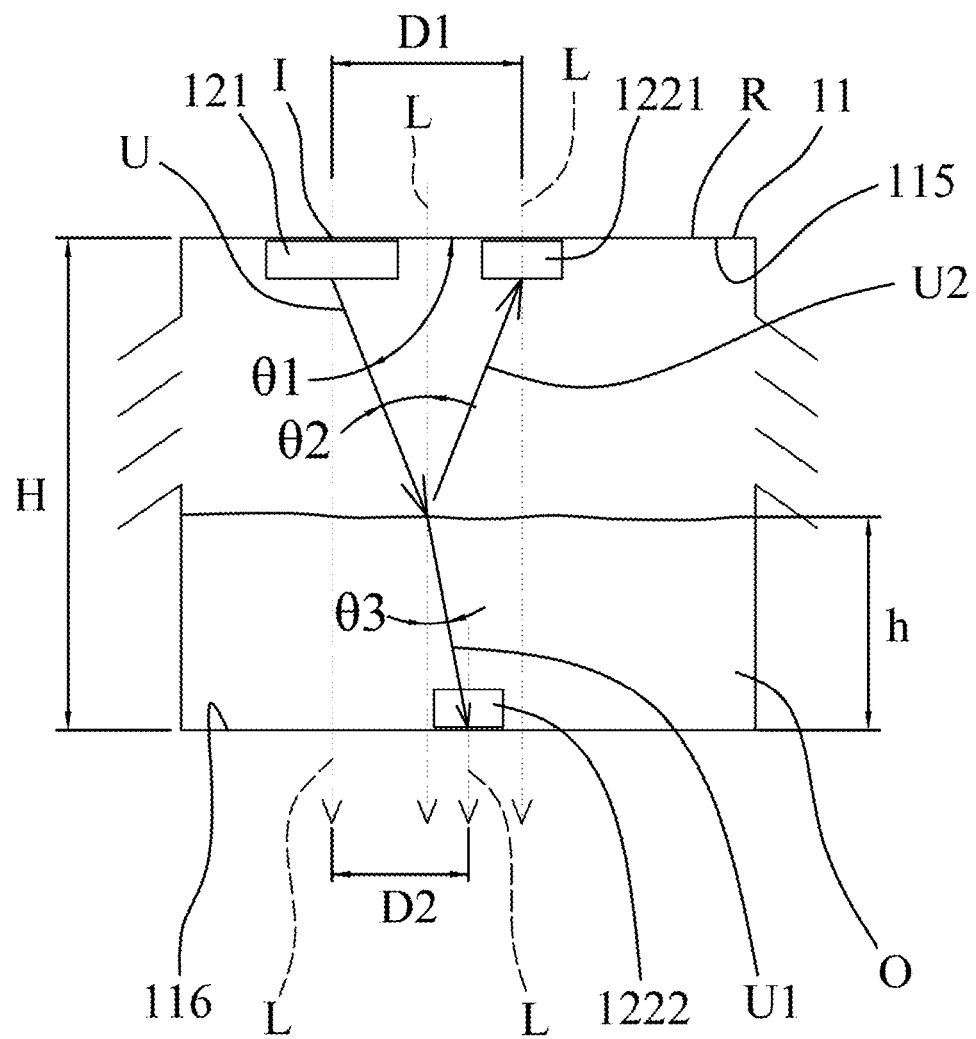
FIG. 2B is a schematic diagram showing an operation of an ultrasonic component having a bottom receiving unit in an embodiment of the present disclosure.

Refer to FIG. 2A and FIG. 2B, the ultrasonic module (12) further comprises a bottom receiving unit (1222) electrically connected to the ultrasonic signal transmitting unit (121), and the bottom receiving unit (1222) is further electrically connected to the calculation unit (123). The bottom receiving unit (1222) and the top receiving unit (1221) are disposed at opposite sides of the reception space (111). The bottom receiving unit (1222) is disposed on the bottom part of the reception space (111), for example, the bottom receiving unit (1222) is disposed on the bottom wall surface (116) of the case (11). The bottom receiving unit (1222) is disposed between the gravity line (L) of the top receiving unit (1221) and the gravity line (L) of the projection point (I). The bottom receiving unit (1222) receives the penetration wave (U1) and measures the speed of the penetration wave (U1), and the bottom receiving unit (1222) transmits the speed of the penetration wave (U1) to the calculation unit (123).

In addition to measure the speed of the penetration wave (U1) by the bottom receiving unit (1222), there are other manners for obtaining the speed of the penetration wave (U1), which are described as follows. An incidence angle ($\theta 2$) is formed by a propagating direction of the ultrasonic wave (U) and an obstacle thickness direction of the obstacle (O), the incidence angle ($\theta 2$) is a complementary angle of the predetermined projection angle ($\theta 1$), and thus the sine value of the incidence angle ($\theta 2$) can be calculated. The propagating direction of the penetration wave (U1) and the obstacle thickness direction of the obstacle (O) form a refraction angle ($\theta 3$), and the bottom receiving unit (1222) calculates a tangent value of the refraction angle ($\theta 3$), wherein the tangent value of the refraction angle ($\theta 3$) is obtained by dividing a difference between a second distance (D2) and half of the first distance (D1) by the obstacle thickness (h), the second distance (D2) is the distance between the gravity line (L) of the bottom receiving unit (1222) and the gravity line (L) of the projection point (I), and the first distance is the distance between the gravity line (L) of the top receiving unit (1221) and the gravity line (L) of the projection point (I). The related equation of the tangent value of the refraction angle ($\theta 3$) is expressed as follows:

$$\tan(\theta 3) = \frac{D2 - \left(\frac{D1}{2}\right)}{h}$$

wherein $\tan(\theta 3)$ is the tangent value of the refraction angle ($\theta 3$), D2 is a second distance which is the distance between the gravity line (L) of the bottom receiving unit (1222) and the gravity line (L) of the projection point (I), D1 is a first distance which is a distance between the gravity line (L) of the top receiving unit (1221) and the gravity line (L) of the projection point (I), and h is the obstacle thickness. Next, the bottom receiving unit (1222) converts the tangent value of the refraction angle ($\theta 3$) to the sine value of the refraction angle ($\theta 3$). According to Snell's law, the product of the speed ultrasonic wave (U) and the sine value of the incidence angle ($\theta 2$) is equal to the product of the speed of the penetration wave (U1) and the sine value of the refraction angle ($\theta 3$), and the related equation is expressed as follows:

$$U \times \sin(\theta 2) = U1 \times \sin(\theta 3)$$

wherein U is a speed of the ultrasonic wave (U), $\sin(\theta 2)$ is a sine value of the incidence angle ($\theta 2$), U1 is the penetration wave (U1), and $\sin(\theta 3)$ is the sine value of the refraction angle ($\theta 3$). Since the speed of the ultrasonic wave (U) can be seen as 331 m/s (the sonic speed in air), and the sine value of the incidence angle ($\theta 2$) and the sine value of the refraction angle ($\theta 3$) can be calculated according to the above equations, the speed of the penetration wave (U1) in the obstacle (O) can be calculated according to Snell's law.

Figure 2C:
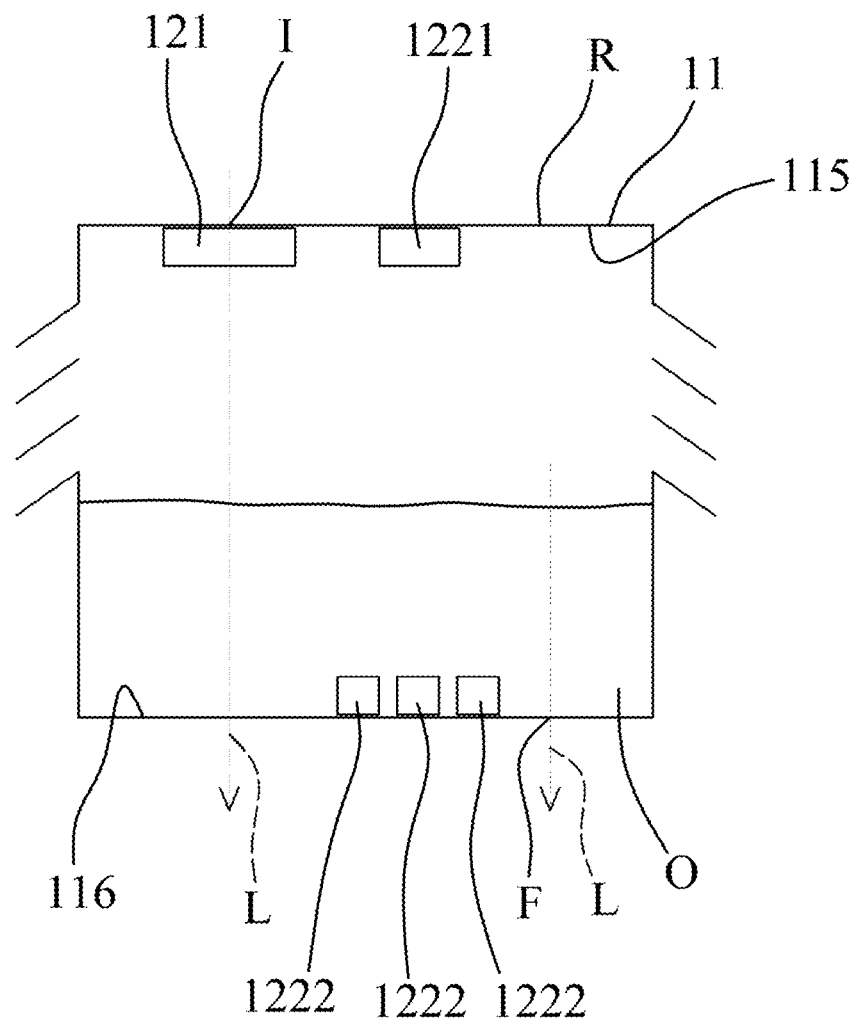
FIG. 2C is a schematic diagram showing a structure of an ultrasonic component having multiple bottom receiving units in an embodiment of the present disclosure.

Refer to FIG. 2C, multiple bottom receiving units (1222) disposed between the gravity line (L) of the projection point (I) and the gravity line (L) of the reception point (F) in a line fashion, and each of the bottom receiving units (1222) is electrically connected to the calculation unit (123) and the ultrasonic signal transmitting unit (121). The line fashion can be a straight or a curved line fashion. Preferably, the top receiving units (1221) are disposed on the top wall surface (115), and the bottom receiving units (1222) are disposed between the projection point (I) and the reception point (F), and arranged in a column or row. The top receiving unit (1221) is not disposed on the reflection point (F).

The calculation unit (123) compares the speed of the penetration wave (U1) transmitted by the bottom receiving unit with an obstacle-speed correspondence database (1231) built in the calculation unit (123). The obstacle-speed correspondence database (1231) is built-in with obstacle types, each obstacle type has an estimated penetration wave speed, and one of the obstacle types corresponds to the obstacle (O). After the speed of the penetration wave (U1) is calculated by the bottom receiving unit (1222) and transmitted to the calculation unit (123), the calculation unit (123) compares the speed of penetration wave (U1) with the estimated penetration wave speeds to find the most approximate estimated penetration wave speed from the obstacle-speed correspondence database (1231), and accordingly determines that the obstacle (O) corresponds to the obstacle type having the most approximate estimated penetration wave speed. The calculation unit (123) can further find that the obstacle (O) corresponds to the density and the acoustic impedance of the specific obstacle type via the obstacle-speed correspondence database (1231). For example, the bottom receiving unit (1222) analyzes the speed of the penetration wave (U1) is 649 m/s, and the speed of the penetration wave (U1) is transmitted to the calculation unit (123). The calculation unit (123) compares the 649 m/s speed of the penetration wave (U1) with the obstacle-speed correspondence database (1231), and the most approximate estimated penetration wave speed in the obstacle-speed correspondence database (1231) is 650 m/s. Next, the obstacle type being snow in the obstacle-speed correspondence database (1231) having the estimated penetration wave speed being 650 m/s is found, and the obstacle (O) is determined as the snow. Next, the calculation unit (123) generates an obstacle type signal according to the determined obstacle type (for example, the obstacle is determined to be snow), and transmits the obstacle type signal to the signal transmitting unit (124). The signal transmitting unit (124) transmits obstacle type signal to the mainboard of the car via the wired or wireless manner. Thus, the ultrasonic module (12) is capable of recognizing the obstacle type of the obstacle (O) in the case (11), and the driver or the maintenance staff can use the determined obstacle type as a basis for the following decision.

Table 1 is used to illustrate the example of the obstacle-speed correspondence database (1231), but the number of the obstacle types and the estimated penetration wave speeds of the obstacle types in Table 1 are not used to limit the present disclosure. The acoustic impedance of the obstacle type is the product of the density and the estimated penetration wave speed of the obstacle type, i.e. $Z=\rho \times C$, wherein Z is the acoustic impedance, $\rho$ is the density and C is estimated penetration wave speed.

TABLE 1

| obstacle type | estimated penetration wave speed C (m/s) | density $\rho$ (Kg/m$^3$) | acoustic impedance Z (Kg/m$^2$/s) |
| --- | --- | --- | --- |
| air | 331 | $0.001293 \times 10^3$ | $0.428 \times 10^3$ |
| water | 1430 | $1.0 \times 10^3$ | $1430 \times 10^3$ |
| ice | 3400 | $0.916 \times 10^3$ | $3114 \times 10^3$ |
| snow | 650 | $0.2 \times 10^3$ | $130 \times 10^3$ |
| sand | 2000 | $2.7 \times 10^3$ | $5400 \times 10^3$ |
| clay | 1800 | $2.75 \times 10^3$ | $4950 \times 10^3$ |

There is another one manner for recognizing the obstacle type of the obstacle (O) stacked in the case (11). The refraction angle ($\theta 3$) can be obtained by the tangent value of the refraction angle ($\theta 3$), and since the different obstacles (O) have different specific refraction angles ($\theta 3$), the calculation unit (123) compares the refraction angle ($\theta 3$) with the obstacle-refraction angle correspondence database (1232) built in the calculation unit (123). The obstacle-refraction angle correspondence database (1232) has the built-in obstacle types, each obstacle type has an estimated refraction angles, and one of the obstacle types corresponds to the obstacle (O). Thus, after the refraction angle ($\theta 3$) is calculated by the bottom receiving unit (1222) and then transmitted to the calculation unit (123), the calculation unit (123) compares the refraction angle ($\theta 3$) with the estimated refraction angles to find the most approximate estimated refraction angle from the obstacle-refraction angle correspondence database (1232), and accordingly determines that the obstacle (O) corresponds to the obstacle type having the most approximate estimated refraction angle. Next, the calculation unit (123) generates an obstacle type signal according to the determined obstacle type, and transmits the obstacle type signal to the signal transmitting unit (124). The signal transmitting unit (124) transmits obstacle type signal to the mainboard of the car via the wired or wireless manner.

It is noted that, there is another one manner for generating the car sunken signal or the obstacle signal. The ultrasonic module (12) comprises the ultrasonic signal transmitting unit (121), the bottom receiving unit (1222) electrically connected to the ultrasonic signal transmitting unit (121), the calculation unit (123) electrically connected to the top receiving unit (1221) and the signal transmitting unit (124) electrically connected to calculation unit (123). The bottom receiving unit (1222) and the ultrasonic signal transmitting unit (121) are disposed at opposite sides of the reception space (111), and the bottom receiving unit (1222) is disposed on the bottom part of the reception space (111). For example, the bottom receiving unit (1222) is disposed on the bottom wall surface (116) of the case (11). The refraction angle ($\theta 3$) is calculated by the bottom receiving unit (1222) based on the tangent value of the refraction angle ($\theta 3$), and the calculation unit (123) compares the refraction angle ($\theta 3$) with the incidence angle ($\theta 2$). When the refraction angle ($\theta 3$) is not identical to the incidence angle ($\theta 2$), the calculation unit (123) generates the car sunken signal or the obstacle signal to the signal transmitting unit (124). The signal transmitting unit (124) transmits the car sunken signal or the obstacle signal via the wired or wireless manner.

Figure 2D:
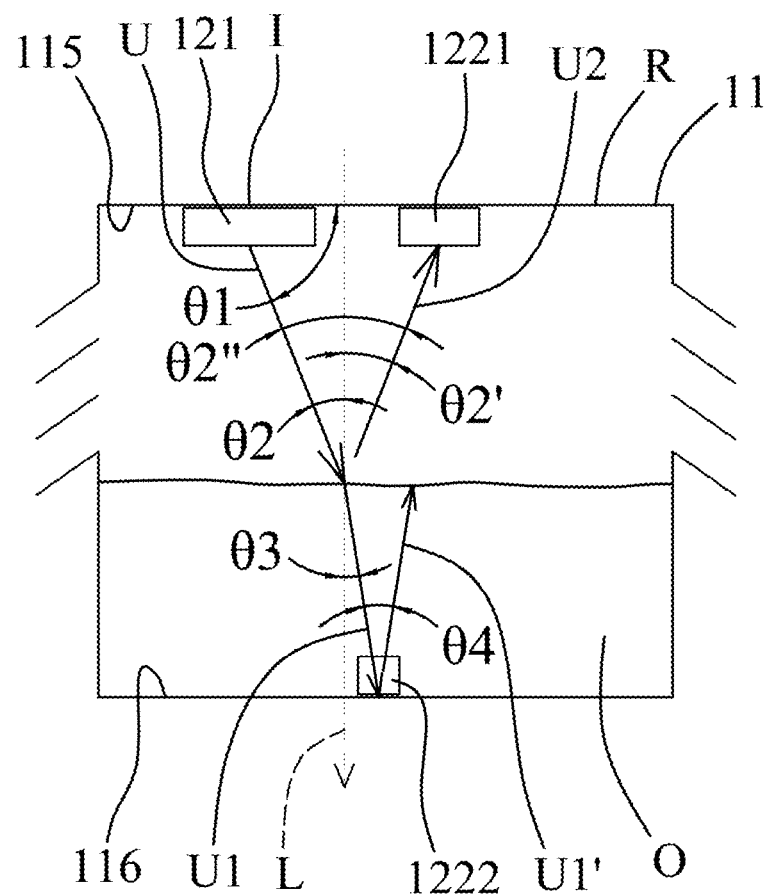
FIG. 2D is a schematic diagram showing an operation of an ultrasonic component having an obstacle reflection angle and a receiving unit reflection angle in an embodiment of the present disclosure.

It is noted that, there is another one manner for generating the car sunken signal or the obstacle signal. Referring to FIG. 2D, The ultrasonic wave (U) and the obstacle (O) form a reflection angle ($\theta 2'$), i.e. a reflection angle ($\theta 2'$) is formed by an obstacle thickness direction of the obstacle (O) and a propagating direction of the reflection wave (U2) which the ultrasonic wave (U) is reflected by the obstacle (O), and the reflection angle ($\theta 2'$) is identical to the incidence angle ($\theta 2$). The ultrasonic wave (U) and reflection wave (U2) form the an obstacle reflection angle ($\theta 2''$), i.e. the reflection angle ($\theta 2'$) and the incidence angle ($\theta 2$) form the obstacle reflection angle ($\theta 2''$), the obstacle reflection angle ($\theta 2''$) is the summation of the reflection angle ($\theta 2'$) and the incidence angle ($\theta 2$), or the obstacle reflection angle ($\theta 2''$) is twice of the incidence angle ($\theta 2$). The penetration wave (U1) collides with the bottom receiving unit (1222), and then a receiving unit reflection wave (U1') is generated. The propagating direction of the penetration wave (U1) and a propagating direction of the receiving unit reflection wave (U1') form a receiving unit reflection angle ($\theta 4$). The receiving unit reflection angle ($\theta 4$) is twice of the refraction angle ($\theta 3$). The calculation unit (123) compares the obstacle reflection angle ($\theta 2''$) with the receiving unit reflection angle ($\theta 4$). When the obstacle reflection angle ($\theta 2''$) is not identical to the receiving unit reflection angle ($\theta 4$), the calculation unit (123) generates the car sunken signal or the obstacle signal to the signal transmitting unit (124). The signal transmitting unit (124) transmits the car sunken signal or the obstacle signal via the wired or wireless manner.

Figure 3A:
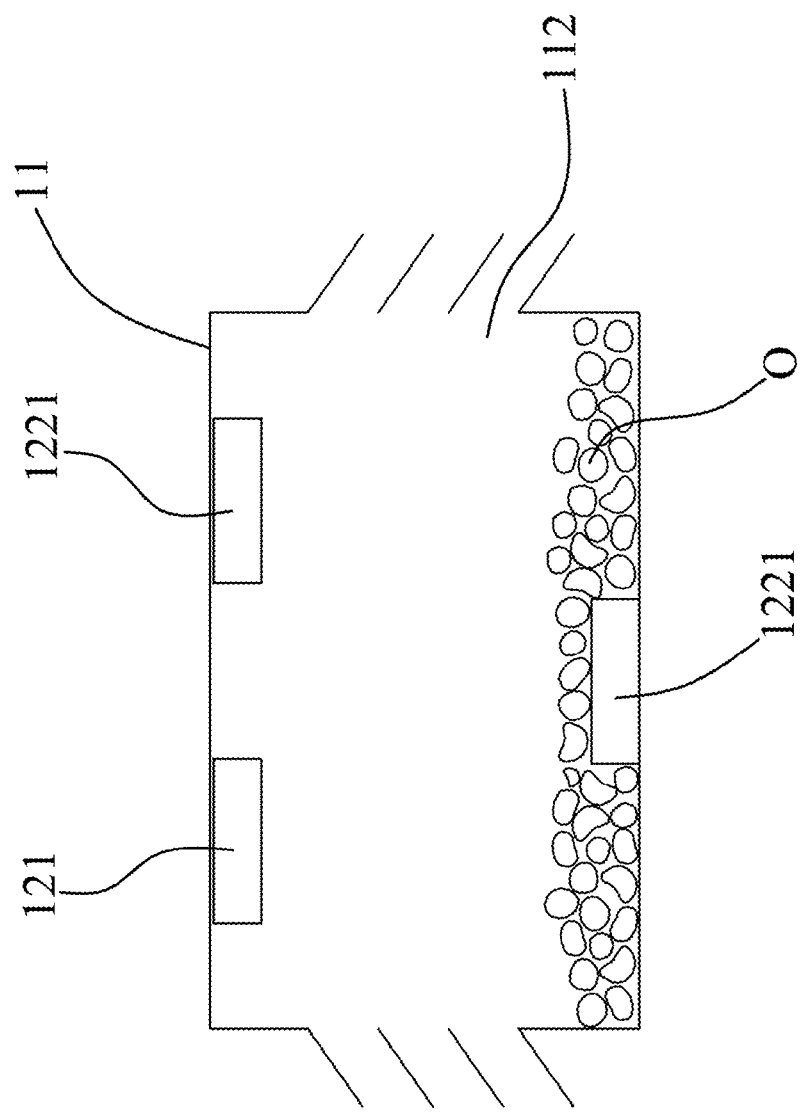
FIG. 3A is a schematic diagram of an ultrasonic component having dust or sand deposited on a bottom part of a reception space in an embodiment of the present disclosure.

Referring to FIG. 2A and FIG. 3A, by using the obstacle-speed correspondence database (1231), when the calculation unit (123) firstly determines the obstacle (O) is not solid water, liquid water and gas water, the calculation unit (123) does not generate the car sunken signal, wherein the situation is that the obstacle (O) is dust, sand or clay and enters the case (11) via the penetration hole (112), for example, when the car moves with the high speed on the road, the dust on the road are brought into the case (11) via the hole (112) to from the obstacle (O). Preferably, when the calculation unit (123) determines the obstacle type, the calculating unit (123) firstly generates an obstacle signal and an obstacle type signal, and the calculation unit (123) does not generate the car sunken signal, the obstacle signal presents that the obstacle (O) exists in the case (11), and the obstacle type signal presents the type of the obstacle (O) in the case (11). It is noted that, the obstacle signal and the obstacle type signal are not the car sunken signal and do not comprise the car sunken signal, and the obstacle signal, the obstacle type signal and the car sunken signal are three different signals. Preferably, the calculation unit (123) transmits the obstacle signal and the obstacle type signal to the signal transmitting unit (124), and the signal transmitting unit (124) transmits the obstacle signal and the obstacle type signal to the main board of the car via the wired or wireless manner. Thus, the ultrasonic module (12) is capable of recognizing the obstacle type of the obstacle (O) in the case (11), and the driver or the maintenance staff can use the obstacle signal and the obstacle type signal as a basis for the following decision. In addition, the calculation unit (123) is build-in with an obstacle thickness upper limit. The calculation unit (123) compares the obstacle thickness (h) with the obstacle thickness upper limit. When the obstacle thickness (h) is larger than or equal to the obstacle thickness upper limit, the calculation unit (123) generates an obstacle-sweeping signal, and the calculation unit (123) transmits the obstacle-sweeping signal to the signal transmitting unit (124). The signal transmitting unit (124) transmits the obstacle-sweeping signal to the mainboard of the car via a wired or wireless manner, and the driver or the maintenance staff can use the obstacle-sweeping signal as a basis for the following decision.

Figure 3B:
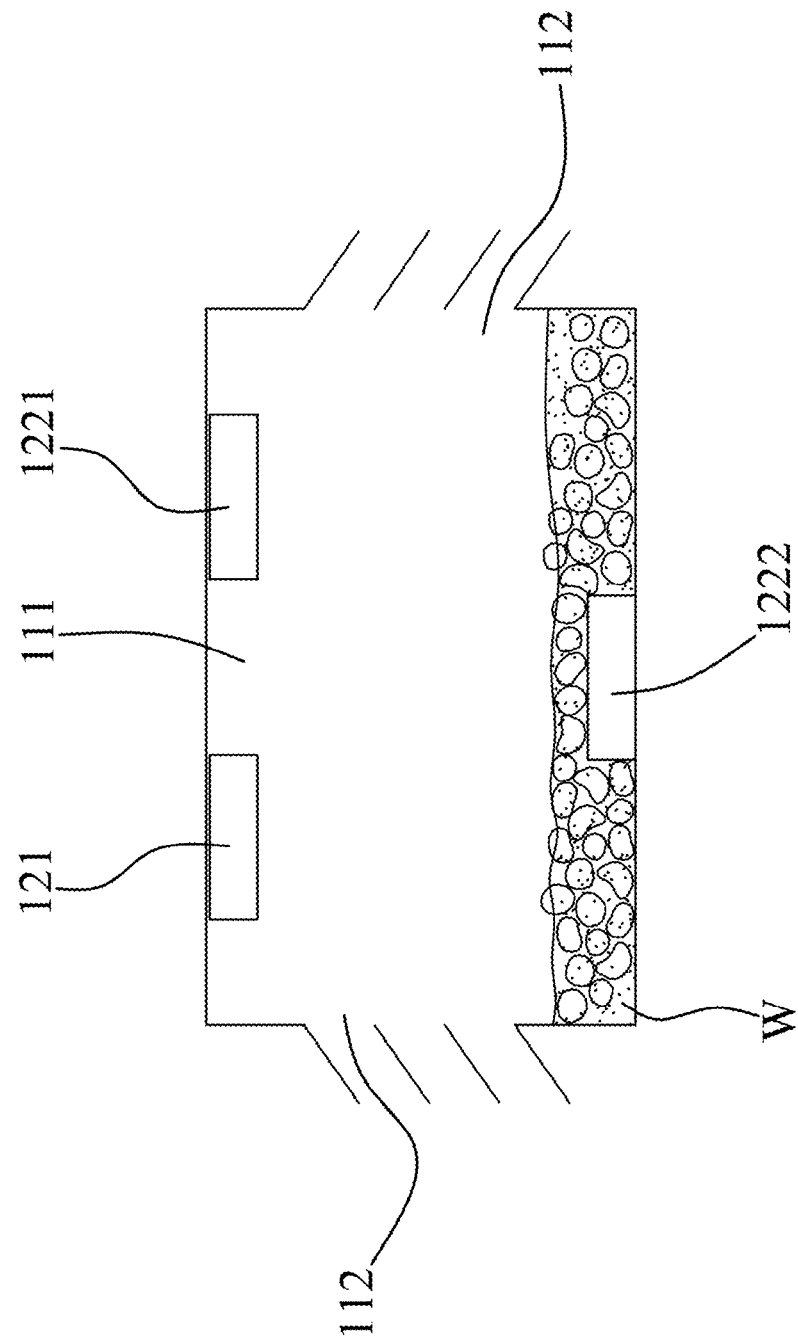
FIG. 3B is a schematic diagram of an ultrasonic component in an embodiment of the present disclosure when much water enters a reception space.

Referring to FIG. 2A and FIG. 3B, when the car is sunken into water, much liquid water (W) quickly enters the reception space (111) via the penetration hole (112), and the calculation unit (123) determines another obstacle is the liquid water (W), or when the calculation unit (123) determines a water film thickness of the liquid water (W) on the bottom part of the reception space (111) is larger than the sunken water film thickness built in the calculation unit (123), the calculation unit (123) generates and transmits the car sunken signal to the signal transmitting unit (124), and the signal transmitting unit (124) transmits the car sunken signal via a wireless or wired manner. The calculation and equation of the water film thickness (i.e. the obstacle height (h)) are described above, and thus omitting the redundant descriptions.

Figure 3C:
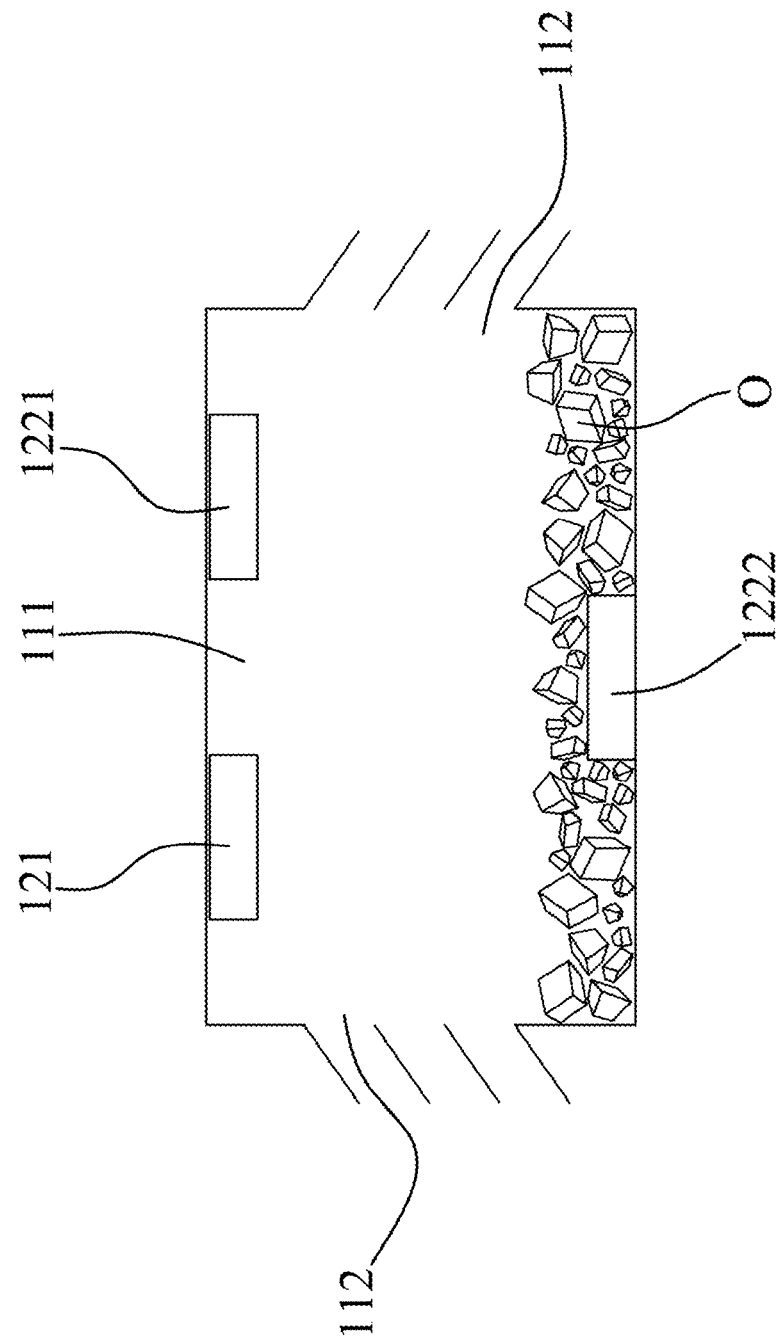
FIG. 3C is a schematic diagram of an ultrasonic component in an embodiment of the present disclosure when much snow is stacked on a bottom part of a reception space.
Figure 3D:
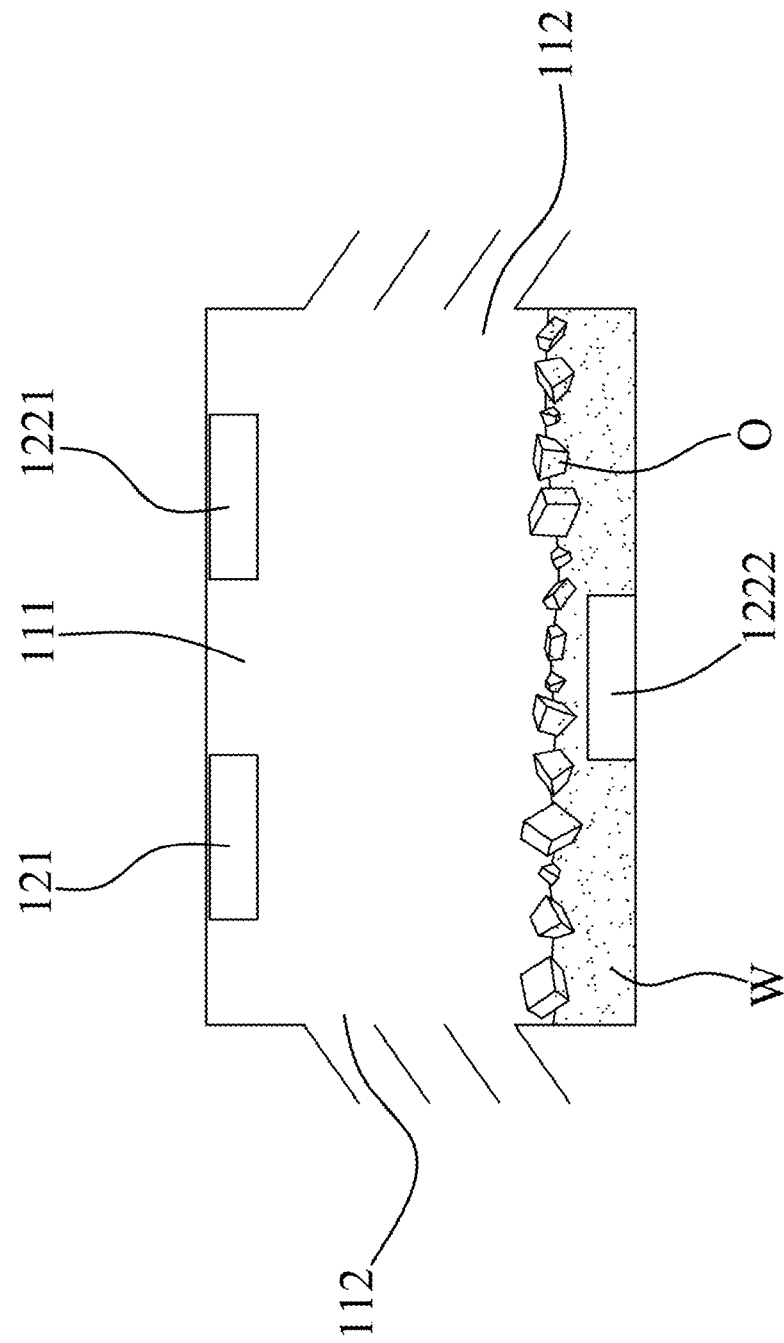
FIG. 3D is a schematic diagram of an ultrasonic component in an embodiment of the present disclosure when partial snow stacked on a bottom part of a reception space is melted.

Referring to FIG. 2A, FIG. 3C and FIG. 3D, similarly, when the calculation unit (23) firstly determines the obstacle (O) is the solid or gas water (such as, snow, ice or fog), the calculation unit (123) firstly generates the obstacle signal and the obstacle type signal, but does not generates the car sunken signal. Next when the calculation unit (123) determines the water film thickness of the liquid water in the bottom part of the reception space (111) is larger than the sunken water film thickness built in the calculation unit (123), the calculation unit (123) generates and transmits the car sunken signal to the signal transmitting unit (124), and the signal transmitting unit (124) transmits the car sunken signal via a wireless or wired manner. The condition usually occurs in the cold region or the foggy region, and the reception space (111) has the obstacle (O) of the fog, ice or snow therein. When the car is activated, the generated heat can gradually condense the fog or melt the ice or snow to form the liquid water (W) on the bottom part of the reception space (111), and the thickness of the water film with the water film thickness is also formed. It is noted that, when the car is sunken into the water, much liquid water (W) quickly enters the reception space (111) via the penetration hole (112), the calculation unit (123) determines the water film thickness of the liquid water (W) on the bottom part of the reception space (111) is larger than the sunken water film thickness built in the calculating unit (123), the calculation unit (123) generates and transmits the car sunken signal to the signal transmitting unit (124), and the signal transmitting unit (124) transmits the car sunken signal via the wireless or wired manner.

Figure 3E:
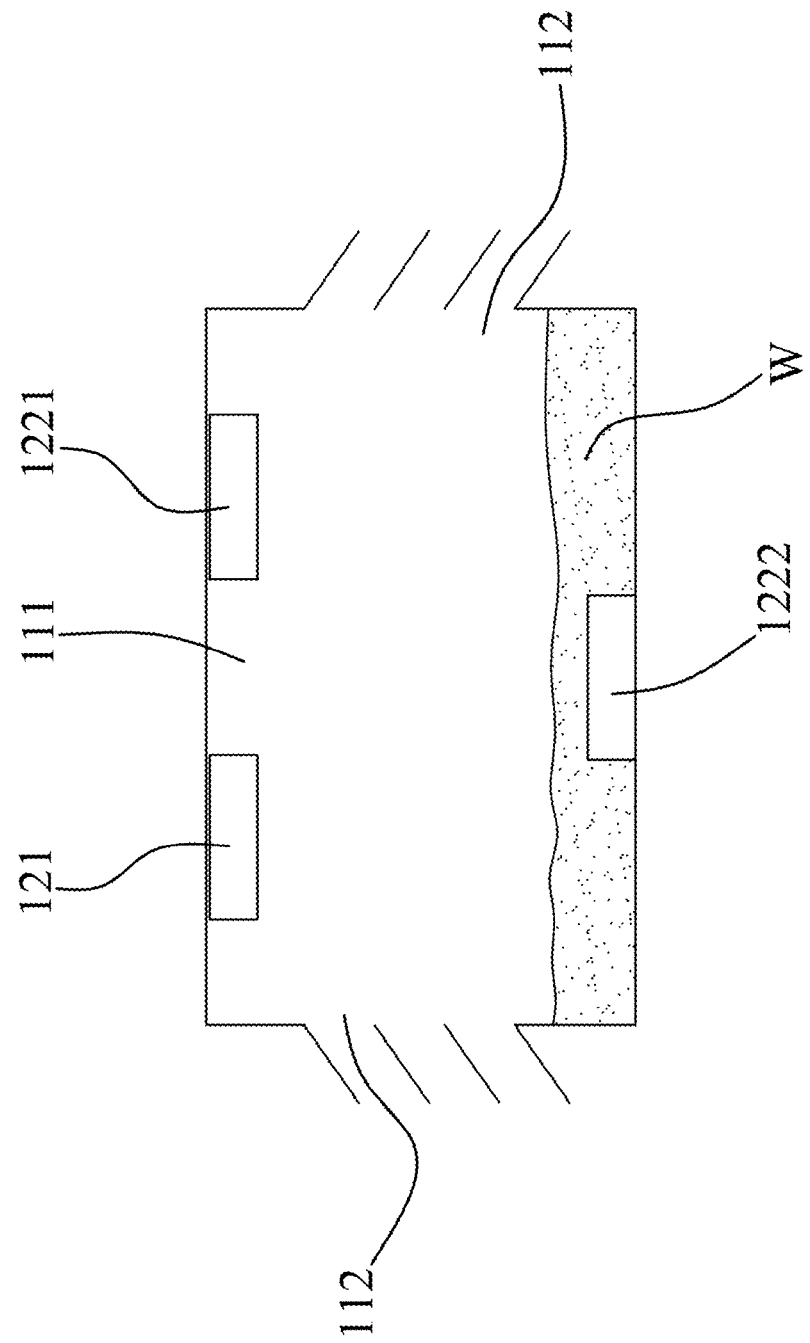
FIG. 3E is a schematic diagram of an ultrasonic component in an embodiment of the present disclosure when liquid water has existed on a bottom part of a reception space.

Referring to FIG. 2A and FIG. 3E, it may occur in the situation that the reception space (111) has the liquid water (W) therein, and the liquid water (W) form the water film with the water film thickness on the bottom part of the reception space (111). When the calculation unit (123) firstly determines the obstacle (O) is the liquid water (W) and the liquid water (W) forms a water film on the bottom part of the reception space (111), the calculation unit (123) firstly generates the obstacle signal and the obstacle type signal, but does not generate the car sunken signal. The calculation unit (123) firstly records the water film thickness as an initial water film thickness, and next when the calculation unit (123) determines the water film thickness increases from the initial water film thickness to exceed the sunken water film thickness built in the calculation unit (123), the calculation unit (123) generates and transmits the car sunken signal to the signal transmitting unit (124), and the signal transmitting unit (124) transmits the car sunken signal via the wireless or wired manner. Naturally, the water film thickness is larger than the initial water film thickness. When the car is sunken into the water, much liquid water (W) quickly enters the reception space (111) via the penetration hole (112), the calculation unit (123) determines the water film thickness of the liquid water (W) on the bottom part of the reception space (111) is larger than the sunken water film thickness built in the calculating unit (123), the calculation unit (123) generates and transmits the car sunken signal to the signal transmitting unit (124), and the signal transmitting unit (124) transmits the car sunken signal via the wireless or wired manner.

Figure 4:
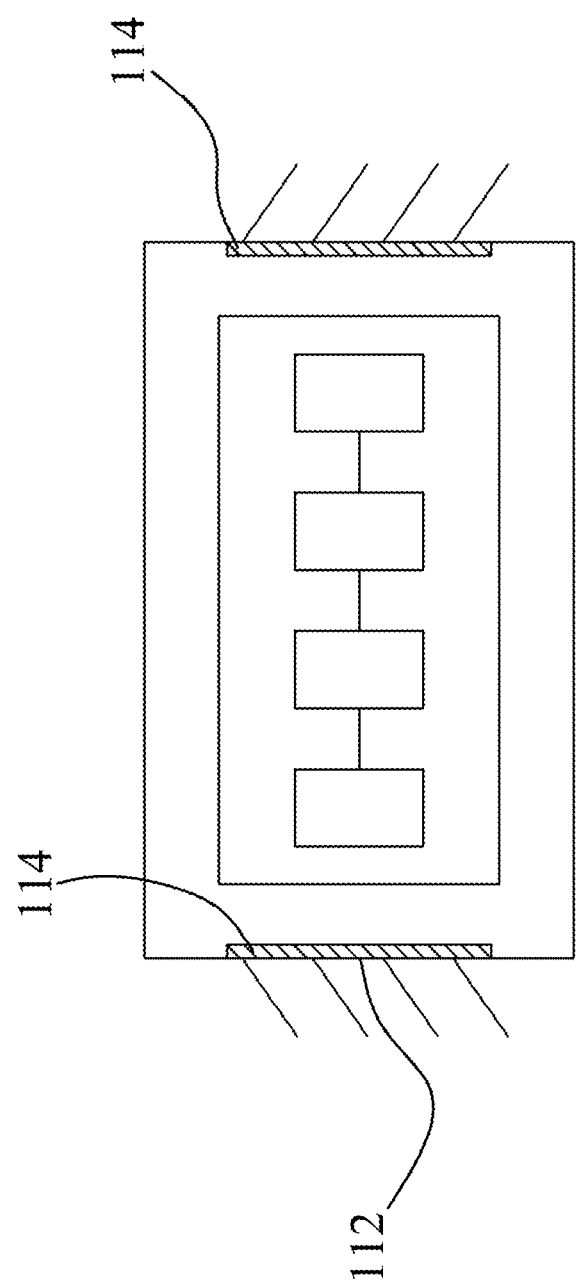
FIG. 4 is a third block diagram showing a configuration of an ultrasonic component in a n embodiment of the present disclosure.

Further, the inner side of the penetration hole (112) has a permeable stratum (114), and the permeable stratum (114) can be a fiber layer or a cloth layer. Referring to FIG. 4, which is a third block diagram showing a configuration of an ultrasonic component in an embodiment of the present disclosure, the permeable stratum (114) of the fiber or cloth layer is disposed in the penetration hole (112), and can prevent the outer dust from entering the case (11), so as to avoid the mistaken decision that the car is sunken in the water.

Figure 5:
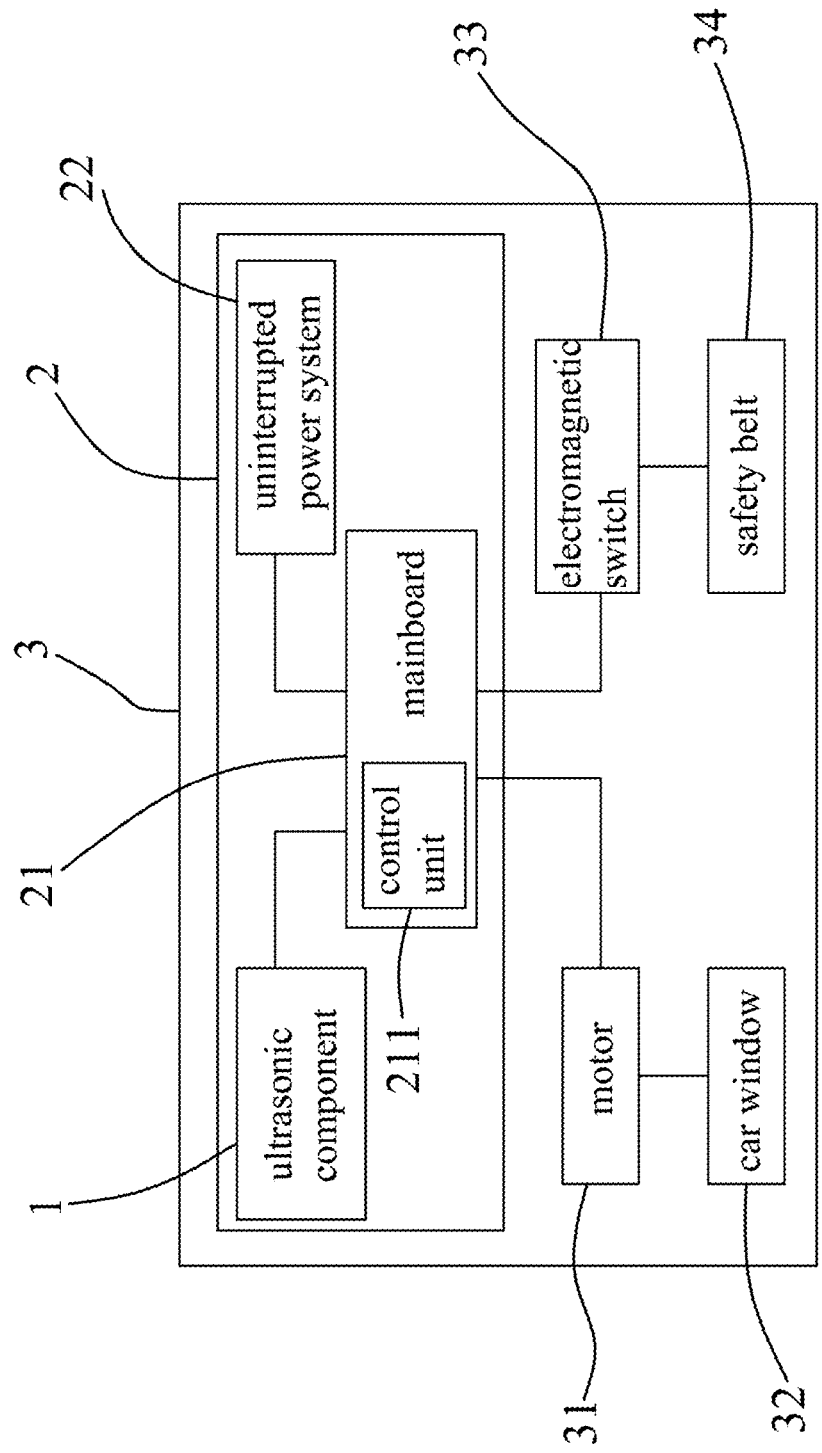
FIG. 5 is a block diagram showing a configuration of an escape system used for a car being sunken into water according to an embodiment of the present disclosure.
Figure 6:
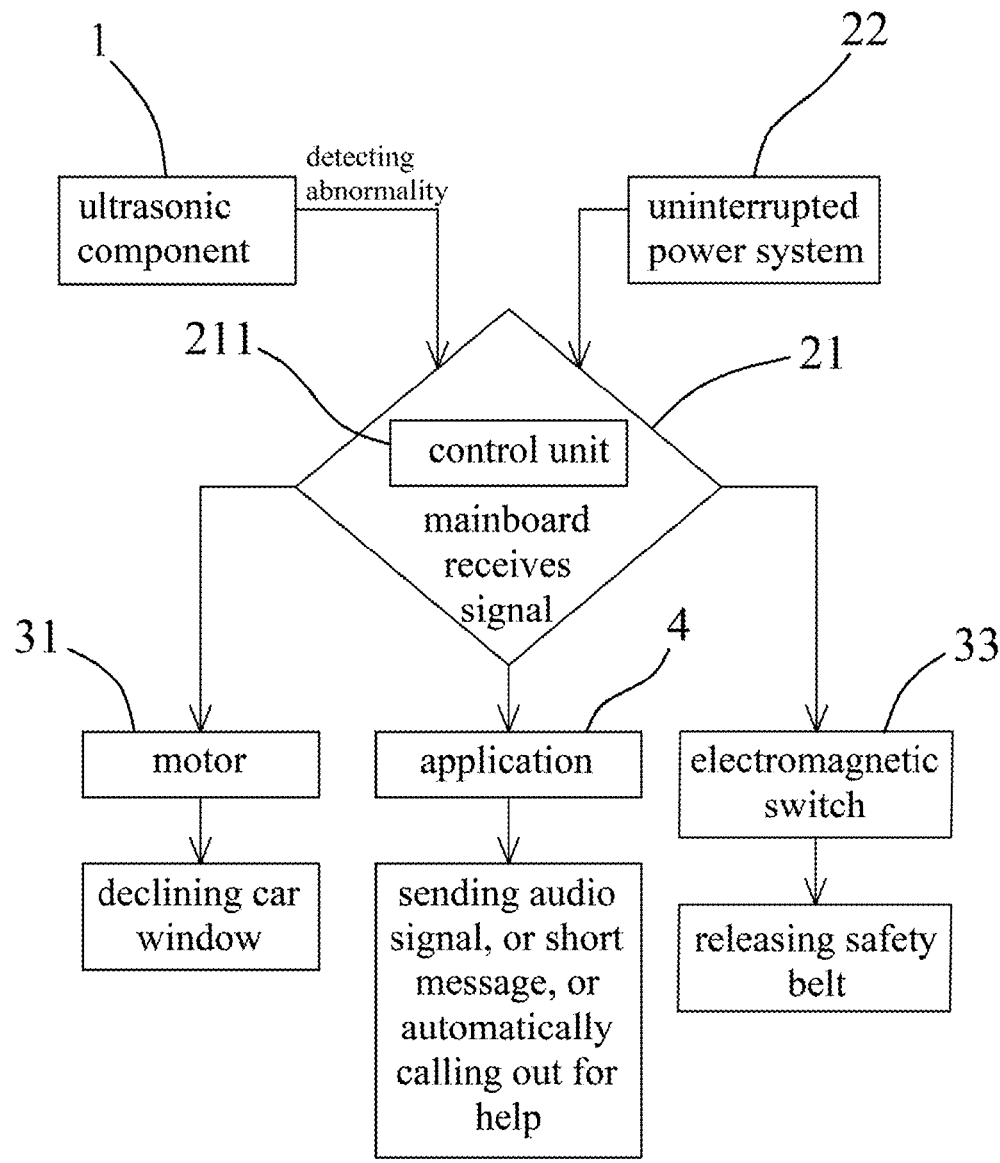
FIG. 6 is a schematic diagram showing an operation of an escape system used for a car being sunken into water according to an embodiment of the present disclosure.

To achieve the above objective, the present disclosure further provides an escape system (2) used for the car being sunken into water. Referring to FIG. 5 and FIG. 6, FIG. 5 is a block diagram showing a configuration of an escape system used for a car being sunken into water according to an embodiment of the present disclosure, and FIG. 6 is a schematic diagram showing an operation of an escape system used for a car being sunken into water according to an embodiment of the present disclosure. The escape system (2) used for the car being sunken into water at least comprises the ultrasonic component (1) and a mainboard (21).

The mainboard (1) is electrically connected to the ultrasonic component (1), and the main board (21) receives the car sunken signal transmitted by the signal transmitting unit (124). The main board (21) is electrically connected to a motor (31) of the car (3) to control at least one car window (32) to be opened and closed, and further electrically connected to an electromagnetic switch (33) to control at least one safety belt (34) to be locked or released. Moreover, the escape system (2) further has an uninterrupted power system (22), and the uninterrupted power system (22) makes the required power of the escape system (2) uninterrupted. In an preferred embodiment, the escape system (2) comprises the above ultrasonic component (1) and the mainboard (21), and the mainboard (21) has a control unit (211), wherein the control unit (211) is electrically connected to the motor (31) and the electromagnetic switch (33) of the car (3), the motor (31) is electrically connected to the car window (32) of the car (3), and the electromagnetic switch (33) is electrically connected to the safety belt (34) of the car (3). When the car (3) is sunken into the water, the mainboard (21) receives car sunken signal transmitted by the signal transmitting unit (124) electrically connected to the mainboard (21), the mainboard (21) controls the motor (31) to open at least the car window (32), and the electromagnetic switch (33) is controlled to release the at least one safety belt (34), such that the driver or person in the car (3) can successfully escape from the car (3). Further, the uninterrupted power system (22) provides the required power to the escape system (2) when the car (3) is sunken into the water and the power is cut off.

Furthermore, the ultrasonic components (1) can be installed on the front side of the car head, the rear side of a car tail, interior of the front left car door, and interior of the front right car door, interior of the rear left car door and interior of the rear right car door, respectively. When the ultrasonic component (1) installed on the front side of the car head detects abnormality (i.e. generating the car sunken signal), or the mainboard (21) receives the car sunken signal transmitted by the signal transmitting unit (124), the mainboard (21) will notify the motors to open the front right car door window, the front left car door window, the rear right car door window, the rear left car door window and the sunroof. When the ultrasonic component (1) installed on the rear side of a car tail detects abnormality (i.e. generating the car sunken signal), the mainboard (21) will notify the motors to open the front right car door window, the front left car door window, the rear right car door window, the rear left car door window and the sunroof. When the ultrasonic component (1) installed on the interior of the front or rear left car door detects abnormality (i.e. generating the car sunken signal), the mainboard (21) will notify the motors to open the front and rear right car door windows, wherein the escaping direction is opposite to the car sunken direction. When the ultrasonic component (1) installed on the interior of the front or rear right car door detects abnormality (i.e. generating the car sunken signal), the mainboard (21) will notify the motors to open the front and rear left car door windows. Further, the sunroof of the car (3) can be also installed with the ultrasonic component (1), and when the ultrasonic component (1) installed on the sunroof detects abnormality (i.e. generating the car sunken signal), the main board (21) will notify the motors to open the front and rear right car door windows and the front and rear left car door windows.

Figure 7:
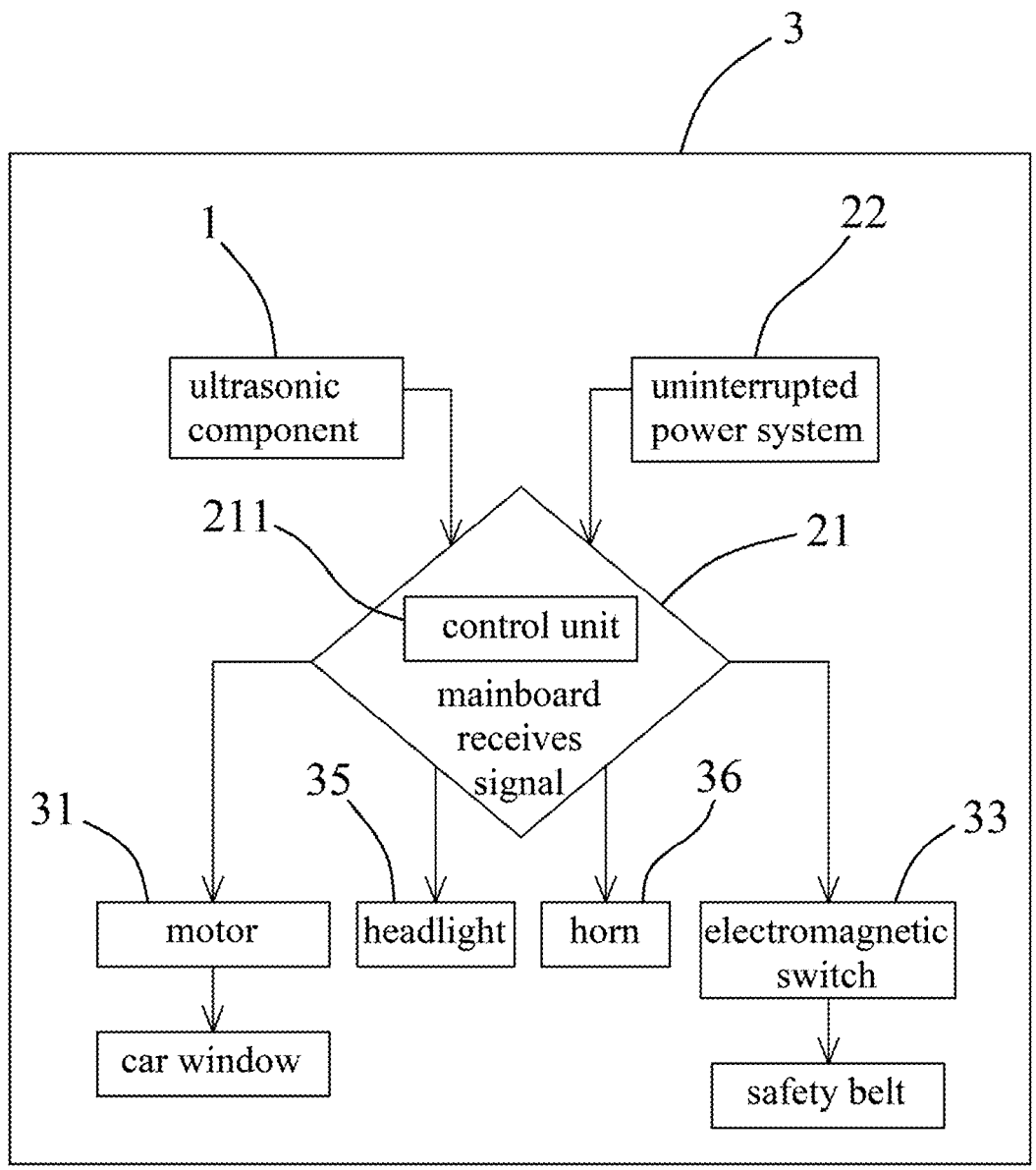
FIG. 7 is a block diagram showing a configuration of an escape system used for a car being sunken into water according to another one embodiment of the present disclosure.
Figure 8:
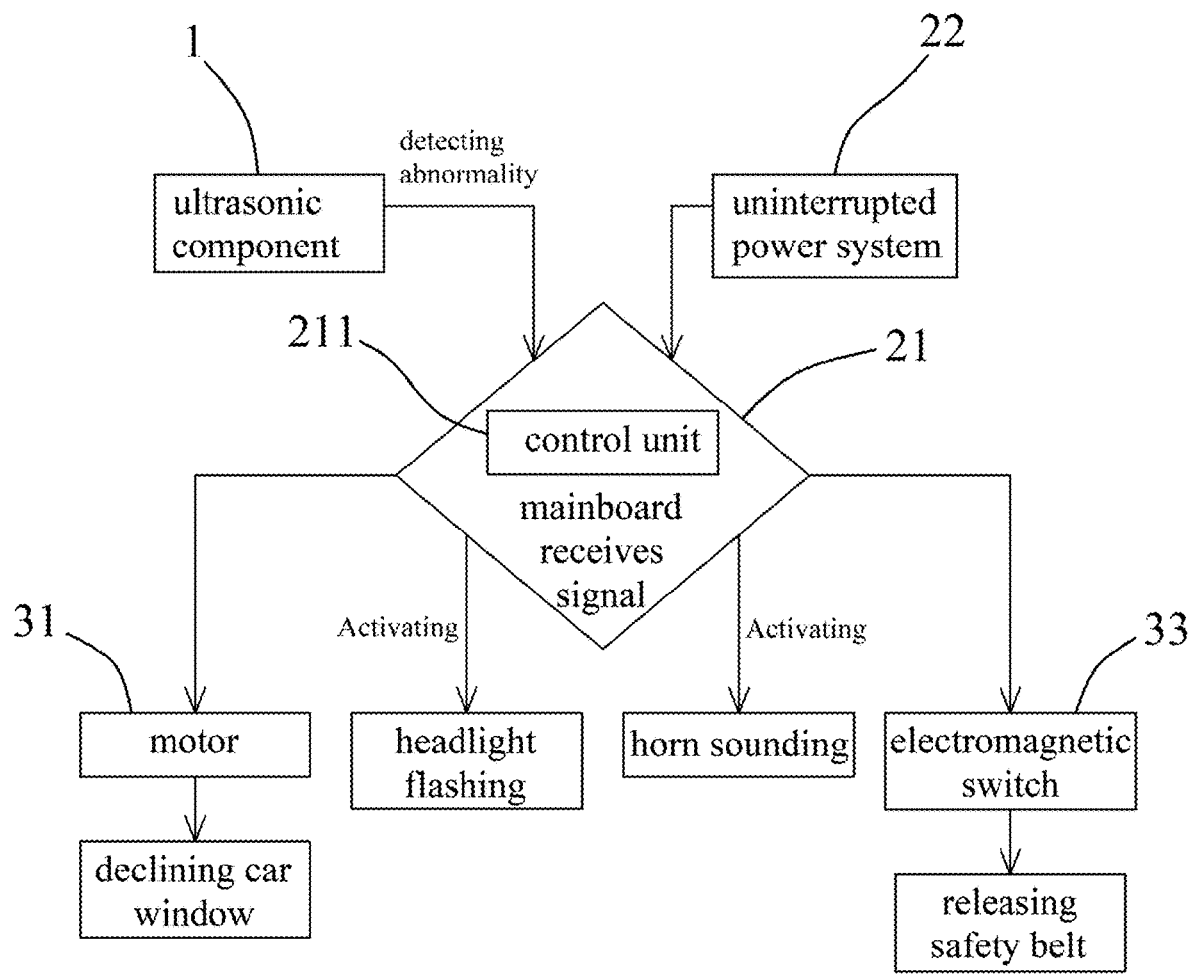
FIG. 8 is a schematic diagram showing an operation of an escape system used for a car being sunken into water according to another one embodiment of the present disclosure.

Referring to FIG. 7 and FIG. 8, FIG. 7 is a block diagram showing a configuration of an escape system used for a car being sunken into water according to another one embodiment of the present disclosure. The escape system (2) can be further linked to an application (4) installed in the device or the car (3) or in the mobile device held by the driver. After the escape system (2) receives the car sunken signal, the automatic location function of the application (4) is activated, and the application (5) can further send out a rescue short message or a rescue call via voice assistant secretary or automatic call out function. In the preferred embodiment, the car (3) is linked to the internet and installed with the application (4), and after the escape system (2) receives the car sunken signal, the automatic location function of the application (4) is activated to let the rescuer know the car sunken location, and the application (4) can further send out a rescue short message via a voice assistant secretary to notify the rescuer.

Further, referring to FIG. 7 and FIG. 8, the control unit (211) of the mainboard (21) can be further connected electrically to a horn (36) and headlights (35) of the car (30). After receiving the car sunken signal, the mainboard (21) will activate the horn (36) to sound, and activate the headlights (35) to flash. In the preferred embodiment of the present disclosure, the mainboard (21) of the escape system (2) is electrically connected to the horn (36) of the car (3). When receiving the car sunken signal, the mainboard (21) of the escape system (2) drives the horn (36) of the car (3) to sound, and thus, the rescuer can find the car sunken location through that sound.

Accordingly, in comparison with the existing technology and product, the escape system used for the car being sunken into water and the ultrasonic component thereof in accordance with the present disclosure, can utilize the property of the ultrasonic to recognize the type and thickness of the obstacle which is accumulated in the ultrasonic component, and to determine whether the warning message for sweeping the obstacle should be sent, so as to maintain the sensitivity of the ultrasonic component. Further, the escape system used for the car being sunken into water and the ultrasonic component thereof are helpful to quickly receive and send out the information which the car is sunken, so as to grasp the rescue opportunity and to decrease the damages or deaths of the users.

To sum up, the escape system used for the car being sunken into water and its ultrasonic component are disclosed by the above embodiments, and can achieve the mentioned technical results. The Applicant believes the escape system used for the car being sunken into water and its ultrasonic component are not anticipated by prior art, and meet the provision of patentability in the patent act, and allowance of the present disclosure is requested respectfully.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by h scope of the present disclosure.

The invention claimed is:

1. An ultrasonic component, at least comprising:
   a case, having a reception space therein, at least one side of the case has at least one penetration hole; and
   an ultrasonic module, disposed in the reception space, the ultrasonic module comprises an ultrasonic signal transmitting unit, at least one top receiving unit electrically connected to the ultrasonic signal transmitting unit, a calculation unit electrically connected to the top receiving unit and a signal transmitting unit electrically connected to the calculation unit; both of the ultrasonic signal transmitting unit and the top receiving unit are disposed at one side of the reception space, and the ultrasonic signal transmitting unit and the top receiving unit are disposed on a top part of the reception space;
   wherein the ultrasonic signal transmitting unit projects an ultrasonic wave; the ultrasonic signal transmitting unit is disposed at a projection point, the ultrasonic signal transmitting unit projects the ultrasonic wave to a bottom wall surface of the case with a projection angle, wherein the projection angle is a complementary angle of an angle formed between a propagating direction of the ultrasonic wave and a gravity line of the projection point, and the projection angle is less than 90 degrees and larger than 0 degree;
   wherein the ultrasonic wave firstly collides with a reflection point of the bottom wall surface, and then is reflected to generate a primary reflection wave; the primary reflection wave propagates toward a top wall surface of the case, and then firstly collides with a scheduled reception point of the top wall surface; a primary path is formed from a path from the projection point to the reflection point and a path from the reflection point to the scheduled reception point; the top receiving unit is not disposed in the primary path.

2. The ultrasonic component of claim 1, wherein when at least one obstacle exists in the case, the ultrasonic wave projected by ultrasonic signal transmitting unit firstly collides with the obstacle, and then is reflected to generate a reflection wave being received by the top receiving unit; after the top receiving unit receives the reflection wave, the top receiving unit generates a reception signal to the calculation unit; the calculation unit converts the reception signal into a car sunken signal or an obstacle signal, and transmits the car sunken signal or the obstacle signal to the signal transmitting unit.

3. The ultrasonic component of claim 2, wherein the top receiving unit is disposed between the gravity line of the projection point and a gravity line of the scheduled reception point, and is not disposed on the scheduled reception point.

4. The ultrasonic component of claim 3, wherein the ultrasonic signal transmitting unit is disposed on the projection point of the top wall surface associated with the case, the projection angle is an angle formed between the propagating direction of the ultrasonic wave and the top wall surface, the top receiving unit is disposed on the top wall surface, and the top receiving unit is disposed between the projection point and the scheduled reception point, and is not disposed on the scheduled reception point.

5. The ultrasonic component of claim 4, wherein the ultrasonic signal transmitting unit and the bottom wall surface has a first height deviation therebetween, a distance between the top receiving unit and the projection point is less than a distance between the projection point and the scheduled reception point, the distance between the projection point and the scheduled reception point is expressed as follows:

$$A = \frac{H}{\tan(\theta 1)} \times 2;$$

wherein A is the distance between the projection point and the scheduled reception point, H is the first height deviation, and tan(θ1) is a tangent value of the projection angle.

6. The ultrasonic component of claim 5, wherein when the ultrasonic signal transmitting unit projects the ultrasonic wave, an initial time which the ultrasonic wave is projected is synchronously transmitted to the top receiving unit; the top receiving unit receives the reflection wave and records a reception time of the reflection wave, the top receiving unit obtains a reflection time difference by subtracting the initial time from the reception time, and the top receiving unit analyzes a reflection distance according to the reflection time difference, wherein the reflection distance is obtained by multiplying a speed of the reflection wave with the reflection time difference; the top receiving unit transmits the reflection distance to the calculation unit, and the calculation unit calculates an obstacle thickness of the at least one obstacle stacked on a bottom part of the reception space, and the obstacle thickness is expressed as follows:

$$h = H - \frac{B}{2} \times \sin(\theta 1);$$

wherein h is the obstacle thickness, H is the first height deviation, B is the reflection distance, and sin(θ1) is a sine value of the projection angle.

7. The ultrasonic component of claim 6, wherein the calculation unit is build-in with an obstacle thickness upper limit, and the calculation unit compares the obstacle thickness with the obstacle thickness upper limit; when the obstacle thickness is larger than or equal to the obstacle thickness upper limit, the calculation unit generates an obstacle-sweeping signal, and the calculation unit transmits the obstacle-sweeping signal to the signal transmitting unit; then, the signal transmitting unit transmits the obstacle-sweeping signal via a wired or wireless manner.

8. The ultrasonic component of claim 6, wherein multiple top receiving units are disposed between the gravity line of the projection point and the gravity line of the scheduled reception point in a line fashion, and each of the top receiving units is electrically connected to the calculation unit.

9. The ultrasonic component of claim 8, wherein when the obstacle thickness increases continuously, the reflection wave generated by a collision of the ultrasonic wave projected by the ultrasonic signal transmitting unit and the obstacle is sequentially received by the top receiving units; after the top receiving units receive the reflection wave, reception signals are sequentially generated to the calculation unit; the calculation unit sequentially converts the reception signals to the car sunken signal or the obstacle signal to the signal transmitting unit.

10. The ultrasonic component of claim 1, wherein the ultrasonic signal transmitting unit projects the ultrasonic wave by projecting an ultrasonic pulse wave with a pulse repetition period, the pulse repetition period is transmitted to the top receiving unit, and the top receiving unit discards and does not calculate an ultrasonic pulse wave not corresponding to the pulse repetition period.

11. The ultrasonic component of claim 10, wherein the ultrasonic signal transmitting unit and the bottom wall surface has a first height deviation therebetween, and the pulse repetition period is expressed as follows:

$$P > \frac{2H}{U \times \sin(\theta 1)};$$

wherein P is the pulse repetition period, H is the first height deviation, U is a speed of the ultrasonic wave, and sin(θ1) is a sine value of the projection angle.

12. An ultrasonic component, at least comprising:
a case, having a reception space therein, at least one side of the case has at least one penetration hole; and
an ultrasonic module, disposed in the reception space, the ultrasonic module comprises an ultrasonic signal transmitting unit, at least one top receiving unit electrically connected to the ultrasonic signal transmitting unit, a calculation unit electrically connected to the top receiving unit and a signal transmitting unit electrically connected to the calculation unit; both of the ultrasonic signal transmitting unit and the top receiving unit are disposed at one side of the reception space, and the ultrasonic signal transmitting unit and the top receiving unit are disposed on a top part of the reception space;
wherein the ultrasonic signal transmitting unit projects an ultrasonic wave; the ultrasonic signal transmitting unit is disposed at a projection point, the ultrasonic signal transmitting unit projects the ultrasonic wave to a bottom wall surface of the case with a projection angle, wherein the projection angle is a complementary angle of an angle formed between a propagating direction of the ultrasonic wave and a gravity line of the projection point, and the projection angle is less than 90 degrees and larger than 0 degree;

wherein the ultrasonic wave firstly collides with a reflection point of the bottom wall surface, and then is reflected to generate a primary reflection wave; the primary reflection wave propagates toward a top wall surface of the case, and then firstly collides with a scheduled reception point of the top wall surface; a primary path is formed from a path from the projection point to the reflection point and a path from the reflection point to the scheduled reception point; the top receiving unit is disposed in the primary path, the ultrasonic signal transmitting unit projects the ultrasonic wave by projecting an ultrasonic pulse wave with a pulse repetition period, and the pulse repetition period is transmitted to the top receiving unit; when the top receiving unit does not receive a reflection wave in two adjacent pulse repetition periods, the top receiving unit generates an interrupt signal to the calculation unit, wherein the reflection wave is generated after the ultrasonic wave collides with at least one obstacle on a bottom part of the reception space; the calculation unit converts the interrupt signal into a car sunken signal or an obstacle signal, and transmits the car sunken signal or the obstacle signal to the signal transmitting unit.

13. The ultrasonic component of claim 12, wherein the top receiving unit is disposed on the scheduled reception point.

14. The ultrasonic component of claim 12, wherein the ultrasonic module further comprises a bottom receiving unit electrically connected to the ultrasonic signal transmitting unit, the bottom receiving unit is electrically connected to the calculation unit; the bottom receiving unit and the top receiving unit are disposed on opposite sides of the reception space; the bottom receiving unit is disposed between a gravity line of the top receiving unit and the gravity line of the projection point.

15. The ultrasonic component of claim 14, wherein when the at least one obstacle exists in the case, the ultrasonic wave firstly penetrates the obstacle, and then a penetration wave is generated; the bottom receiving unit receives the penetration wave, measures a speed of the penetration wave, and transmits the speed of the penetration wave to the calculation unit.

16. The ultrasonic component of claim 15, wherein the speed of the penetration wave is obtained as follows: an incidence angle is formed by a propagating direction of the ultrasonic wave and an obstacle thickness direction of the obstacle, and the incidence angle is a complementary angle of the projection angle; the propagating direction of the penetration wave and the obstacle thickness direction of the obstacle form a refraction angle, and the bottom receiving unit calculates a tangent value of the refraction angle as follows:

$$\tan(\theta 3) = \frac{D2 - \left(\frac{D1}{2}\right)}{h};$$

wherein $\tan(\theta 3)$ is the tangent value of the refraction angle; D2 is a second distance which is a distance between the gravity line of the bottom receiving unit and the gravity line of the projection point; D1 is a first distance which is a distance between the gravity line of the top receiving unit and the gravity line of the projection point; h is an obstacle thickness; the obstacle thickness is expressed as follows:

$$h = H - \frac{B}{2} \times \sin(\theta 1);$$

wherein H is a first height deviation, B is a reflection distance, and $\sin(\theta 1)$ is a sine value of the projection angle, the ultrasonic signal transmitting unit and the bottom wall surface has the first height deviation therebetween, and the reflection distance is obtained by multiplying a speed of the reflection wave with a reflection time difference obtained by the top receiving unit;

wherein the bottom receiving unit converts the tangent value of the refraction angle to a sine value of the refraction angle, and calculates the speed of the penetration wave as follows:

$U \times \sin(\theta 2) = U1 \times \sin(\theta 3);$ wherein U is a speed of the ultrasonic wave, sin(82) is a sine value of the incidence angle, U1 is the penetration wave, and sin(83) is the sine value of the refraction angle.

17. The ultrasonic component of claim 15, wherein the calculation unit compares the speed of the penetration wave transmitted by the bottom receiving unit with an obstacle-speed correspondence database built in the calculation unit, the obstacle-speed correspondence database is built-in with obstacle types, each obstacle type has an estimated penetration wave speed, and one of the obstacle types corresponds to the obstacle; the calculation unit compares the speed of penetration wave with the estimated penetration wave speeds to find the most approximate estimated penetration wave speed, and accordingly determines that the obstacle corresponds to the obstacle type having the most approximate estimated penetration wave speed.

18. The ultrasonic component of claim 17, wherein when the calculation unit firstly determines the obstacle is not solid water, liquid water and gas water, the calculation unit does not generate the car sunken signal, but generates the obstacle signal and the obstacle type signal to the signal transmitting unit; then, the signal transmitting unit transmits the obstacle signal and an obstacle type signal via a wired or wireless manner.

19. The ultrasonic component of claim 17, wherein when the calculation unit firstly determines the obstacle is solid water or gas water, the calculation unit does not generate the car sunken signal, but generates the obstacle signal and an obstacle type signal; next, when the calculation unit determines a thickness of a water film of a liquid water on a bottom part of the reception space is larger than a sunken water film thickness built in the calculation unit, the calculation unit generates the car sunken signal to the signal transmitting unit; then, the signal transmitting unit transmits the car sunken signal via a wired or wireless manner.

20. The ultrasonic component of claim 17, wherein when the calculation unit firstly determines the obstacle is a liquid water and a water film is formed on a bottom part of the reception space, the calculation unit does not generate the car sunken signal, but generates the obstacle signal and an obstacle type signal; the calculation unit being configured to record a water film thickness as an initial water film thickness, and next, when the calculation unit determines that the water film thickness increases from the initial water film thickness to exceed a sunken water film thickness built in the reception unit, the calculation unit generates the car sunken signal to the signal transmitting unit; then, the signal transmitting unit transmits the car sunken signal via a wired or wireless manner.

21. An ultrasonic component, at least comprising:
a case, having a reception space therein, at least one side of the case has at least one penetration hole; and
an ultrasonic module, disposed in the reception space, the ultrasonic module comprises an ultrasonic signal transmitting unit, at least one bottom receiving unit electrically connected to the ultrasonic signal transmitting unit, a calculation unit electrically connected to the bottom receiving unit and a signal transmitting unit electrically connected to the calculation unit; the ultrasonic signal transmitting unit and the bottom receiving unit are disposed at opposite sides of the reception space, and the bottom receiving unit is disposed on a bottom part of the reception space;
wherein the ultrasonic signal transmitting unit projects an ultrasonic wave; the ultrasonic signal transmitting unit is disposed at a projection point, the ultrasonic signal transmitting unit projects the ultrasonic wave to a bottom wall surface of the case with a projection angle, wherein the projection angle is a complementary angle of an angle formed between a propagating direction of the ultrasonic wave and a gravity line of the projection point, and the projection angle is less than 90 degrees and larger than 0 degree;
when at least one obstacle exists in the case, the ultrasonic wave firstly penetrates the obstacle, and then a penetration wave is generated while a reflection wave is correspondingly generated; an incidence angle is formed by a propagating direction of the ultrasonic wave and an obstacle thickness direction of the obstacle, and the incidence angle is a complementary angle of the projection angle; the propagating direction of the penetration wave and the obstacle thickness direction of the obstacle form a refraction angle, and the bottom receiving unit calculates a tangent value of the refraction angle as follows:

$$\tan(\theta 3) = \frac{D2 - \left(\frac{D1}{2}\right)}{h};$$

wherein $\tan(\theta 3)$ is the tangent value of the refraction angle; D2 is a second distance which is a distance between a gravity line of the bottom receiving unit and the gravity line of the projection point; D1 is a first distance which is a distance between a gravity line of a top receiving unit and the gravity line of the projection point; h is an obstacle thickness; the obstacle thickness is expressed as follows:

$$h = H - \frac{B}{2} \times \sin(\theta 1);$$

wherein H is a first height deviation, B is a reflection distance, and $\sin(\theta 1)$ is a sine value of the projection angle, the ultrasonic signal transmitting unit and the bottom wall surface has the first height deviation therebetween, and the reflection distance is obtained by multiplying a speed of the reflection wave with a reflection time difference obtained by the top receiving unit;
the refraction angle is calculated by the bottom receiving unit according to the tangent value of the refraction angle, and then transmitted to the calculation unit; the calculation unit compares the refraction angle with the incidence angle; when the refraction angle is not identical to the incidence angle, the calculation unit generates a car sunken signal or an obstacle signal to the signal transmitting unit, and the signal transmitting unit transmits the car sunken signal or the obstacle signal via a wired or wireless manner.

22. An ultrasonic component, at least comprising:
a case, having a reception space therein, at least one side of the case has at least one penetration hole; and
an ultrasonic module, disposed in the reception space, the ultrasonic module comprises an ultrasonic signal transmitting unit, at least one bottom receiving unit electrically connected to the ultrasonic signal transmitting unit, a calculation unit electrically connected to the bottom receiving unit and a signal transmitting unit electrically connected to the calculation unit; the ultrasonic signal transmitting unit and the bottom receiving unit are disposed at opposite sides of the reception space, and the bottom receiving unit is disposed on a bottom part of the reception space;
wherein the ultrasonic signal transmitting unit projects an ultrasonic wave; the ultrasonic signal transmitting unit is disposed at a projection point, the ultrasonic signal transmitting unit projects the ultrasonic wave to a bottom wall surface of the case with a projection angle, wherein the projection angle is a complementary angle of an angle formed between a propagating direction of the ultrasonic wave and a gravity line of the projection point, and the projection angle is less than 90 degrees and larger than 0 degree;
when at least one obstacle exists in the case, the ultrasonic wave firstly penetrates the obstacle, and then a penetration wave is generated while a reflection wave is correspondingly generated; an incidence angle is formed by a propagating direction of the ultrasonic wave and an obstacle thickness direction of the obstacle, a reflection angle is formed by an obstacle thickness direction of the obstacle and a propagating direction of a reflection wave which the ultrasonic wave is reflected by the obstacle, and the incidence angle is a complementary angle of the projection angle; the reflection angle and the incidence angle form an obstacle reflection angle, the obstacle reflection angle is twice of the incidence angle; a propagating direction of the penetration wave and the obstacle thickness direction of the obstacle form a refraction angle, and the bottom receiving unit calculates a tangent value of the refraction angle as follows: the penetration wave collides with the bottom receiving unit to generate a receiving unit reflection wave, the propagating direction of the penetration wave and a propagating direction of the receiving unit reflection wave form a receiving unit reflection angle, and the receiving unit reflection angle is twice of the refraction angle; the bottom receiving unit calculates a tangent value of the refraction angle as follows:

$$\tan(\theta 3) = \frac{D2 - \left(\frac{D1}{2}\right)}{h};$$

P1; wherein $\tan(\theta 3)$ is the tangent value of the refraction angle; D2 is a second distance which is a distance between a gravity line of the bottom receiving unit and the gravity line of the projection point; D1 is a first distance which is a distance between a gravity line of a top receiving unit and the gravity line of the projection point; h is an obstacle thickness; the obstacle thickness is expressed as follows:

$$h = H - \frac{B}{2} \times \sin(\theta 1);$$

wherein H is a first height deviation, B is a reflection distance, and $\sin(\theta 1)$ is a sine value of the projection angle, the ultrasonic signal transmitting unit and the bottom wall surface has the first height deviation therebetween, and the reflection distance is obtained by multiplying a speed of the reflection wave with a reflection time difference obtained by the top receiving unit;

the refraction angle is calculated by the bottom receiving unit according to the tangent value of the refraction angle, and then transmitted to the calculation unit, the calculation unit compares the obstacle reflection angle with the receiving unit reflection angle; when the obstacle reflection angle is not identical to the receiving unit reflection angle, the calculation unit generates a car sunken signal or an obstacle signal to the signal transmitting unit, and the signal transmitting unit transmits the car sunken signal or the obstacle signal via a wired or wireless manner.

23. An escape system used for a car being sunken into water, installed in the car, and the escape system at least comprises:

the at least one ultrasonic component of claim 2; and a mainboard, electrically connected to the ultrasonic component; after the mainboard receives the car sunken signal transmitted by the signal transmitting unit, a motor electrically connected to the mainboard is controlled to open at least one car window, and an electromagnetic switch electrically connected to the mainboard is controlled to release at least one safety belt.

24. The escape system of claim 23, wherein the escape system further comprises an uninterrupted power system which makes required power of the escape system uninterrupted.

25. The escape system of claim 23, wherein the escape system is further linked to an application installed in a device of the car or a mobile communication device of an user of the car, and after the escape system receives the car sunken signal, an automatic location function of the application is activated.

* * * * *